United States Patent [19]

Yu

[11] Patent Number: 5,939,795
[45] Date of Patent: Aug. 17, 1999

[54] SEAT SENSOR OPERATING SAFETY SYSTEM FOR A MOTOR VEHICLE

[76] Inventor: Wei Kong Yu, 6288 Pride La., Las Vegas, Nev. 89103

[21] Appl. No.: 09/005,705

[22] Filed: Jan. 12, 1998

Related U.S. Application Data

[63] Continuation-in-part of application No. 08/796,781, Feb. 10, 1997, Pat. No. 5,780,937.

[51] Int. Cl.$^6$ .................................................. B60R 25/00
[52] U.S. Cl. ........................... 307/10.1; 307/9.1; 701/45; 340/426
[58] Field of Search ..................................... 307/9.1–10.8, 307/38, 39; 180/287, 268, 270, 271–273, 286, 289; 701/1, 36, 45–47; 340/667, 436, 457, 457.1, 425.5, 426, 438; 280/735, 728.1, 801.1, 802, 805, 806, 748; 200/61.583

[56] References Cited

U.S. PATENT DOCUMENTS

| | | | |
|---|---|---|---|
| 3,781,854 | 12/1973 | Kaufman et al. | 307/10.1 |
| 4,655,505 | 4/1987 | Kashiwamura et al. | 297/284 |
| 4,796,013 | 1/1989 | Yasuda et al. | 180/272 |
| 4,856,613 | 8/1989 | Reginold | 180/282 |
| 4,929,925 | 5/1990 | Bodine et al. | 307/9.1 |
| 5,103,951 | 4/1992 | Inui et al. | 192/0.046 |
| 5,365,438 | 11/1994 | Mitchell et al. | 364/423.03 |
| 5,574,315 | 11/1996 | Weber | 307/10.1 |
| 5,602,425 | 2/1997 | Wilhelmi et al. | 307/10.1 |
| 5,655,619 | 8/1997 | Suran et al. | 180/270 |
| 5,678,854 | 10/1997 | Meister et al. | 280/735 |
| 5,706,909 | 1/1998 | Bevins et al. | 180/273 |

*Primary Examiner*—Jeffrey Gaffin
*Assistant Examiner*—Jonathan S Kaplan
*Attorney, Agent, or Firm*—Quirk & Tratos

[57] ABSTRACT

Seat sensor switches connected to the drivers seat and passenger's seat of a motor vehicle generate signals indicating when the seats are occupied. The passenger sensor switch generates an adult present signal, a child or small adult signal, or an infant/small child present signal depending on the size of the occupant. In response to a signal indicating that all the seats are unoccupied, the parking brake is set, a windshield curtain and a side window sunshade panel are deployed, and the headlamps and ceiling light are deactivated. In response to an adult present signal from the passenger sensor switch, a first quantity of air bag propellant is electrified, the air bag is aimed at an upper location, and the shoulder belt anchor is moved to an upper position. In response to a child or small adult present signal from the passenger sensor switch, a second, smaller quantity of air bag propellant is electrified, the air bag is aimed at a lower location, and the shoulder belt anchor is moved to a lower position. In response to an infant/small child present signal from the passenger sensor switch, the air bag is deactivated and the passenger side window and door are locked. In response to a signal indicating that any of the seats are occupied, the Windshield curtain and side window sunshade panel are withdrawn, and the radio and electric cigarette lighter are activated. In response to a driver present signal while the engine is running, the parking brake is released.

20 Claims, 14 Drawing Sheets

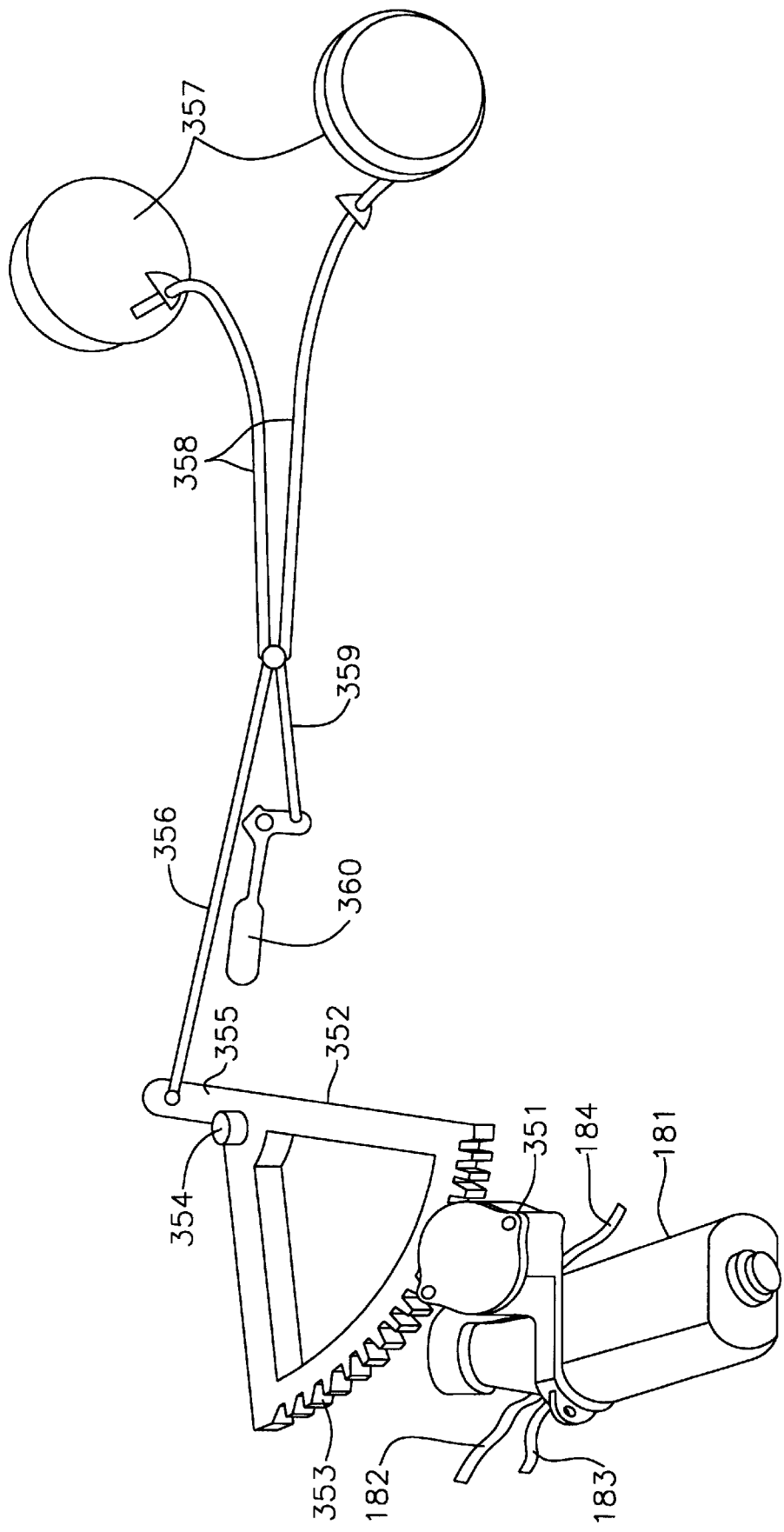

SEAT SENSOR OPERATING SAFETY SYSTEM FOR A MOTOR VEHICLE

RELATED PATENT APPLICATIONS

This application is a continuation-in-part of U.S. patent application Ser. No. 08/796,781 filed Feb. 10, 1997 U.S. Pat. No. 5,780,937.

BACKGROUND OF THE INVENTION

1. Field of the Invention

This invention is in the general field of motor vehicles and, more particularly, is a safety system predicated upon sensing both the presence and the absence of a person seated in a motor vehicle.

2. Description of the Prior Art

A well known motor vehicle safety device is an air bag that is deployed to protect a driver or a passenger in a motor vehicle in the event of a vehicular accident, such as a collision. When the accident occurs, sensors in the vehicle detect the degree of severity of a frontal impact. If two sensors (one primary and one safing) close at the same time, electric current flows to an inflator and the system ignites the gas generant. The propellant then rapidly burns in a metal container. The rapid burning produces nitrogen gas to inflate the air bag. Both the quantity of the propellant and the location of the air bag are not adjustable in spite of a child or a small size adult passenger being present seated. The great strength and the wrong direction of deployment of an air bag may result in the death or injury of the passenger. Therefore, it is desirable to adjust the quantity of the propellant and the location of the air bag automatically in accordance with the size of the passenger. Moreover, although an air bag on-off switch is available to protect an infant or a small child, the effectiveness of the switch depends upon a person in the vehicle, usually the driver, remembering to operate the switch appropriately. It is desirable to switch on or to switch off an air bag automatically in accordance with the size of the passenger.

Another well known motor vehicle safety device is a seat belt that maintains either a driver or a passenger in a seat in the event of an accident. If the shoulder belt is off an user's shoulder or on his upper arm, there is a greater risk of severe injury in a collision. The user must adjust his shoulder belt height. It is troublesome and depends upon his remembering to adjust it appropriately. It is desirable to adjust a shoulder belt height automatically in accordance with the size of the user.

Another well known motor vehicle safety device is a child safeguard function. When an infant or a small child is present in a passenger's seat, the driver turns on a switch of the child safeguard function to cause all the passenger side electrically operated windows being closed and locked, and to cause all passenger side electric door locks being locked, being not to open from inside of the motor vehicle. The effectiveness of the switch depends upon the driver's remembering to operate the switch appropriately. So when an infant or a small child is present in a passenger's seat, it is desirable to close and to lock only his side electrically operated window, and to lock his side electric door lock automaticlly. When an infant or a small child is absent in a passenger's seat, it is desirable to turn his side electrically operated window and his side electric door lock back to the normal condition automatically for the usage of next passenger.

Another well known motor vehicle security device is a parking brake (hand brake) that maintains the motor vehicle at a correct position, whenever and wherever it parks. To set a parking brake while a motor vehicle parks, or to release a parking brake while the engine of motor vehicle starts, usually depends upon the driver's remembering to do it appropriately. It is desirable to set an electrically operated parking brake automatically while every one of the driver and the passengers leaves the vehicle, and to release an electrically operated parking brake automatically while the driver starts the engine of the vehicle.

To close an electrically operated sunroof usually depends upon a person in the vehicle, usually the driver, remembering to operate the switch appropriately. It is desirable to close an electrically operated sunroof automatically while everyone of the driver and the passengers leaves the vehicle. spreading a piece of sunshade panel to cover a windshield or a side window while a motor vehicle parks, is a well known motor vehicle security device that protects both personal properties and the vehicle's equipments. But doing it is troublesome. The windshield is hardly to be fully covered. It is desirable to spread an electrically operated curtain fully covering a windshield or a side window automatically while everyone of the driver and the passengers leaves the vehicle, and to roll up an electrically operated curtain automatically while either a driver or a passenger is present seated.

To turn off the headlamps usually depends upon a driver's remembering to turn off a switch. Although some motor vehicles' headlamps are automatically turned off while the engines of the vehicles are turned off and the drivers' doors are opened. But it is not the best way. It is desirable to turn off the headlamps automatically while everyone of the driver and the passengers leaves the vehicle.

To turn off a ceiling light usually depends upon remembering of either a driver or a passenger to turn off a switch. It is desirable to turn off a ceiling light automatically while everyone of the driver and the passengers leaves the vehicle.

To activate a radio or an electric cigarette ligher usually depends upon a driver turning on an igniting key. It is desirable to activate a radio or an electric cigarette lighter automatically while either a driver or a passenger is present seated.

The present invention resolves all above desirable problems depending on an electric safety system operated by seat sensor switches.

SUMMARY OF THE INVENTION

An object of the present invention is to adjust both the quantity of the propellant and the location of a passenger's air bag in accordance with the size of a passenger.

Another object of the present invention is to adjust a shoulder belt height in accordance with the size of an user.

Another object of the present invention is to set a parking brake when a motor vehicle parks, and to release a parking brake when the engine of a motor vehicle starts.

Another object of the present invention is to spread a windshield curtain covering a windshield when a motor vehicle parks, and to roll it up when a person is present seated in a motor vehicle.

According to a first aspect of the present invention, in response to a passenger's seat of a motor vehicle being occupied by an adult, a passenger sensor switch generates an adult present signal, to cause the part of large quantity of the propellant of an air bag being electrified, and the air bag device moves to a higher location. In response to a passenger's seat being occupied by a child or a small adult, a passenger sensor switch generates a child/small adult (CSA)

present signal, to cause the part of small quantity of the propellant being electrified, and the air bag device moves to a lower location. In response to a passenger's seat being occupied by an infant or a small child, a passenger sensor switch generates an infant/small child (ISC) present signal, to cause both the parts of the propellant being non-electrified, and the air bag does not move.

According to a second aspect of the present invention, a passenger (or a driver) shoulder belt anchor moves to a higher position in concurrent response to an adult present signal, and it moves to a lower position in concurrent response to a CSA present signal.

According to a third aspect of the present invention, a passenger side window is closed and locked in concurrent response to an ISC present signal.

According to a fourth aspect of the present invention, a passenger side door lock is strictly locked in concurrent response to an ISC present signal.

According to a fifth aspect of the present invention, in response to all the driver's and the passenger's seats being unoccupied, the sensor switches generate a vehicle empty security signal to cause a parking brake being set. The parking brake is released in concurrent response to a driver present signal of the driver sensor switch when the engine of the vehicle starts.

According to a sixth aspect of the present invention, a sunroof of a motor vehicle is closed in concurrent response to a vehicle empty security signal.

According to a seventh aspect of the present invention, a windshield curtain fully covers a windshield in concurrent response to a vehicle empty security signal. In response to either a driver's seat or a passenger's seat being occupied, the sensor switches generate a vehicle loaded security signal to cause a windshield curtain being rolled up.

According to an eighth aspect of the present invention, a piece of a side window sunshade panel moves up to cover a side window of a motor vehicle in concurrent response to a vehicle empty security signal, and it moves down to uncover the window in concurrent response to a vehicle loaded security signal.

According to a nineth aspect of the present invention, the headlamps of a motor vehicle are turned off in concurrent response to a vehicle empty security signal.

According to a tenth aspect of the present invention, a ceiling light of a motor vehicle is turned off in concurrent response to a vehicle empty security signal.

According to an eleventh aspect of the present invention, a radio device of a motor vehicle is activated in concurrent response to a vehicle loaded security signal.

According to a twelfth aspect of the present invention, an electric cigarette lighter of a motor vehicle is activated in concurrent response to a vehicle loaded security signal.

The gist of the invention is utilization of seat sensor switches for all aspects of a security system for a motor vehicle. The seat sensor generates different signals that are used in deployment of an air bag, to adjust a shoulder belt height, to cause activation of a child safeguard function, to set or to release a parking brake, to close a sunroof, to spread or to roll up a windshield curtain, to move up or to move down a side window sunshade panel, to turn off the head lamps, to turn off a ceiling light, and to activate a radio device and a cigarette lighter.

Other objects, features, and advantages of the invention should be apparent from the following description of the preferred embodiment as illustrated in the accompanying drawings.

BRIEF DESCRIPTION OF THE DRAWINGS

FIG. 2b is a perspective view, with parts broken away, of two metal containers in an inflator of FIG. 2a;

FIG. 3b is a side view of the shoulder belt height adjusting device of FIG. 3a;

FIG. 4 is a perspective view of an electrically operated parking brake that is included in the embodiment of FIG. 1;

FIGS. 5b, 5c and 5d are perspective views, with parts broken away, of different parts of the windshield curtain of FIG. 5a;

FIGS. 6b and 6c are perspective views from different directions, with parts broken away, of the main structure of the switch in FIG. 6a;

FIG. 7b is a perspective view of the main structure of the switch in FIG. 7a;

DETAILED DESCRIPTION OF THE PREFERRED EMBODIMENT

This invention is predicated upon utilizing a seat sensor switch in a driver's seat of a motor vehicle and a seat sensor switch in a passenger's seat of the vehicle to generate different signals in accordance with the size of the driver and the passenger. Each seat sensor switch generates five kinds of signals as followings: an adult present signal in response to the seat being occupied by an adult, a CSA (child/small adult) signal in response to the seat being occupied by a child or a small adult, an ISC (infant/small child) signal in response to the seat being occupied by an infant or a small child, two absent signals in response to the seat being unoccupied.

In order to set forth the teachings of the present invention without confusing detail, the vehicle is described as having a driver's seat, two passenger seats, two passenger windows, two passenger doors, two passenger air bags, two passenger seat belts, a sunroof, two headlamps, a ceiling light, a windshield that needs to be covered, a side window that needs to be covered, a radio and a cigarette lighter. It should be understood that the invention has utility when the vehicle has more than two passenger seats, two windows, two doors, two air bags, two seat belts, a sunroof, two headlamps, a ceiling light, a radio, a cigarette lighter, a windshield and a side window that need to be covered.

Figure 1:
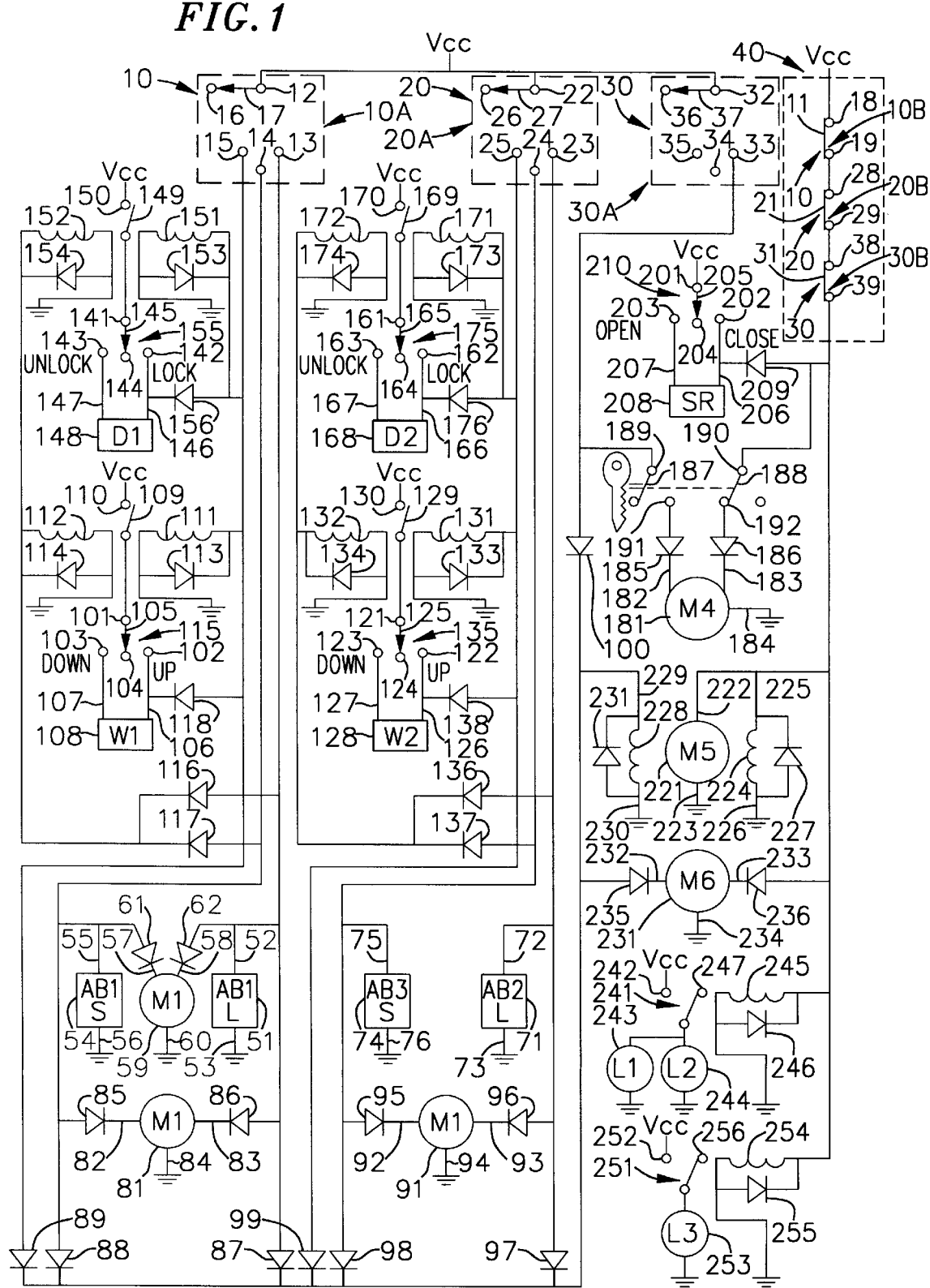
FIG. 1 is a schematic block diagram of the preferred embodiment of the present invention.

As shown in FIG. 1, a passenger sensor switch 10 is installed within a first passenger's seat of the vehicle. The structure of the switch 10 is described hereinafter in connection with FIG. 6a.

The switch 10 has a normally open part 10A that includes a contact 12. Additionally, a normally closed part 10B of the switch 10 includes a contact 18. The contacts 12, 18 are connected to a positive terminal of a voltage source that provides a voltage referred to as Vcc. In this embodiment the voltage, Vcc, is provided by the positive terminal of a battery of the vehicle.

The normally open part 10A additionally includes four contacts 13, 14, 15 and 16. In response to the first passenger's seat being occupied by an adult, a switch bar 17 electrically connects the contacts 12, 13. The contacts 12, 13 are normally open but close in response to the first passenger's seat being occupied by an adult, whereby an adult present signal voltage, substantially equal in amplitude to the voltage, Vcc, is generated at the contact 13. Similar to contacts 12, 13, in response to the first passenger's seat being occupied by a child or a small adult, the switch bar 17 electrically connects the normally open contacts 12, 14, a CSA present signal voltage is generated at the contact 14. In response to the first passenger's seat being occupied by an infant or a small child, the switch bar 17 electrically connects the normally open contacts 12, 15, an ISC present signal voltage is generated at the contact 15. In response to the first passenger's seat being unoccupied, the switch bar 17 electrically connects the contacts 12, 16, a passenger absent signal voltage is generated at the contact 16. The contacts 12, 16 are normally closed but open in response to the first passenger's seat being occupied.

The normally closed part 10B additionally includes a contact 19. In response to the first passenger's seat being unoccupied, a switch bar 11, similar to the switch bar 17 connects the contacts 18, 19. The contacts 18, 19 are normally closed, whereby a passenger absent signal voltage, substantially equal in amplitude to the voltage, Vcc, is generated at the contact 19. The contacts 18, 19 are normally closed but open in response to the first passenger's seat being occupied.

A passenger sensor switch 20, similar to the switch 10, is installed within a second passenger's seat of the vehicle. The switch 20 has a normally open part 20A and a normally closed part 20B.

Similar to the contact 12, a contact 22 of the part 20A is connected to Vcc. In response to the second passenger's seat being occupied by an adult, a switch bar 27 electrically connects the normally open contacts 22, 23, an adult present signal voltage is generated at the contact 23. In response to the second passenger's seat being occupied by a child or a small adult, the switch bar 27 electrically connects the normally open contacts 22, 24, a CSA present signal voltage is generated at the contact 24. In response to the second passenger's seat being occupied by an infant or a small child, the switch bar 27 electrically connects the normally open contacts 22, 25, an ISC present signal voltage is generated at the contact 25. In response to the second passenger's seat being unoccupied, the switch bar 27 electrically connects the contacts 22, 26, a passenger absent signal voltage is generated at the contact 26. The contacts 22, 26 are normally closed but open in response to the second passenger's seat being occupied.

In response to the second passenger's seat being unoccupied, a switch bar 21 of the part 20B, similar to the switch bar 11, electrically connects contacts 28, 29. The contacts 28, 29 are normally closed but open in response to the second passenger's seat being occupied. The contact 28 is connected to the contact 19. Accordingly, the contacts 18, 19 and the contacts 28, 29 are connected in series.

A driver sensor switch 30, similar to the switch 10, is installed within a driver's seat of the vehicle. The switch 30 has a normally open part 30A and a normally closed part 30B.

Similar to the contact 12, a contact 32 of the part 30A is connected to Vcc. In response to the driver's seat being occupied, a switch bar 37 electrically connects the normally open contacts 32, 33, a driver present signal voltage is generated at the contact 33. In response to the driver's seat being unoccupied, the switch bar 37 electrically connects the contacts 32, 36, a driver absent signal voltage is generated at the contact 36. The contacts 32, 36 are normally closed but open in response to the driver's seat being occupied. We assume the driver always being an adult so that the contacts 34, 35 are not in use in the present invention.

In response to the driver's seat being unoccupied, a switch bar 31 of the part 30B, similar to the switch bar 11, electrically connects contacts 38, 39. The contacts 38, 39 are normally closed but open in response to the driver's seat being occupied. The contact 38 is connected to the contact 29. Accordingly, the contacts 18, 19, the contacts 28, 29 and the contacts 38, 39 are all connected in series, as shown in section 40.

When the switches 10, 20, 30 do not provide either a passenger present signal voltage or a driver present signal voltage, a vehicle empty security signal voltage, substantially equal in amplitude to the voltage, Vcc, is generated at the contact 39. It should be understood that the contacts 12, 16, the contacts 22, 26 and the contacts 32, 36 can not be instead of the contacts 18, 19, the contacts 28, 29 and the contacts 38, 39 to generate a vehicle empty security signal voltage. In the present invention, there is not an item (except possibly an electrically operated parking brake) being operated by either a passenger absent signal voltage or a driver absent signal voltage, so that the contacts 16, 26 and 36 are not in use.

When a driver does not want a vehicle empty security signal voltage to be applied to any item of a vehicle while everyone of driver and passengers leaves, a simple switch (not shown in FIG. 1) operated by the driver is connected between the contact 39 and the item.

Figure 2A:
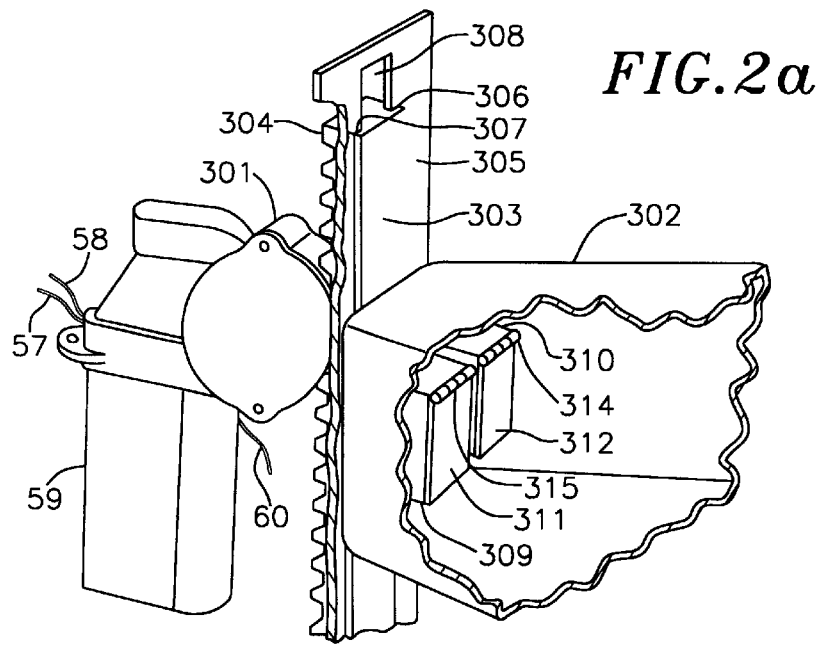
FIG. 2a is a perspective view, with parts broken away, of an adjusted electrically operated air bag device that is included in the embodiment of FIG. 1.
Figure 2B:
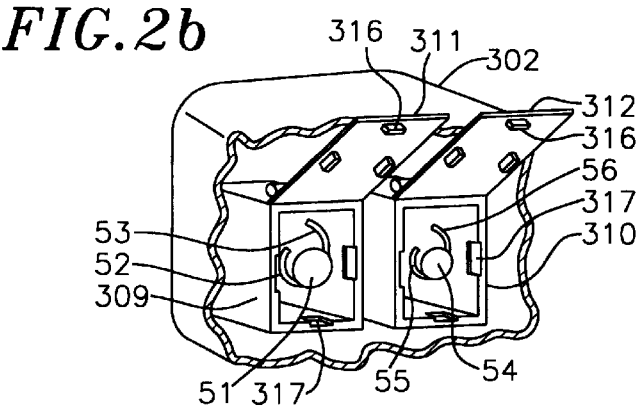

As shown in FIG. 1 in connection with FIGS. 2a and 2b, an inflator 302 of an air bag of the first passenger's seat includes two independent metal containers 309, 310. There are two doors 311, 312 connected respectively with two hinges 315, 314 to the containers 309, 310. Some rods 316 and some ditches 317 locate respectively on the interior surfaces of the doors 311, 312 and the containers 309, 310, so that the doors 311, 312 are strictly closed but open easily from the insides. An air bag igniter 51 (AB1, L) with a large quantity of the propellant, two electric wires 52, 53 is installed in the container 309. An air bag igniter 54 (AB1, S) with a small quantity of the propellant, two electric wires 55, 56 is installed in the container 310. The air bag device with inflator 302 is fixed to a movable gear rack 303. Two guide ditches 306, 307 locate respectively on two side surfaces of the gear rack 303. A plate 305 with a guide rail 308 scarfs into the ditches 306, 307 to limit the gear rack 303 only moving up and down. The gear rack 303 with the gear teeth 304 is coupled to a motor 59 (M1) through a worm wheel assembly 301. The gear rack 303 is in meshing engagement with the wheel of the assembly 301, the worm of which is coupled to the rotary shaft of the motor 59. The motor 59, the worm wheel assembly 301 and the plate 305 are fastened to the vehicle respectively. The motor 59 has two leading-in electric wires 58, 57 and an outgoing electric wire 60 to rotate the motor 59 in different directions when electric current flows from different leading-in wires. The wire 58 is connected to the contact 13 through a diode 62. The wire 57 is connected to the contact 14 through a diode 61. The wire 60 is connected to ground. The wires 52, 55 are connected respectively to the contacts 13, 14. The wires 53, 56 are connected to ground.

In response to the first passenger's seat being occupied by an adult, an adult present signal voltage is applied respectively to the air bag igniter 51 (AB1, L) via wire 52, and to the motor 59 via diode 62, wire 58. The motor 59 rotates in the forward direction, such rotation is transmitted through the assembly 301 to move the gear rack 303 up. Thus the air bag device with the inflator 302 is moved to a higher position, and the igniter 51 with a large quantity of the propellant is on stand-by. The air bag will deploy with a stronger strength and a right direction when an accident occurs. In response to the first passenger's seat being occupied by a child or a small adult, a CSA present signal voltage is applied respectively to the air bag igniter 54 (AB1, S) via wire 55, and to the motor 59 via diode 61, wire 57. The motor 59 rotates in the reverse direction to cause the gear rack 303 down. Thus the air bag device with the inflator 302 is moved to a lower position, and the igniter 54 with a small quantity of the propellant is on stand-by. The air bag will deploy with a less strength and a right direction when an accident occurs. In response to the first passenger's seat being occupied by an infant or a small child, or being unoccupied, no signal voltage is applied to the motor 59 and both the igniters 51, 54. The air bag will not deploy when an accident occurs.

Figure 2C:
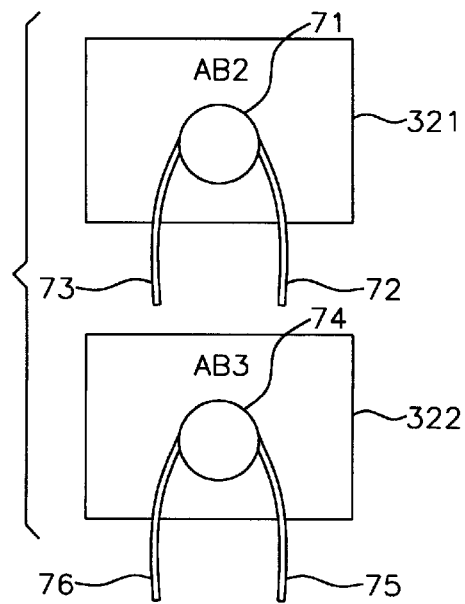
FIG. 2c is a simple diagram of another kind of an adjusted air bag system that is included in the embodiment of FIG. 1.

As shown in FIG. 1 in connection with FIG. 2c, the air bag system of the second passenger's seat includes two independent air bag devices 321, 322 which locate respectively at a higher position and at a lower position. An igniter 71 with a large quantity of the propellant and two electric wires 72, 73 is installed in the higher air bag device 321 (AB2, L). An igniter 74 with a small quantity of the propellant and two electric wires 75, 76 is installed in the lower air bag device 322 (AB3, S). The wire 72 is connected to the contact 23. The wire 75 is connected to the contact 24. The wires 73, 76 are connected to ground.

In response to the second passenger's seat being occupied by an adult, an adult present signal voltage is applied to the igniter 71 to make it on stand-by. The higher air bag 321 will deploy with a stronger strength when an accident occurs. In response to the second passenger's seat being occupied by a child or a small adult, a CSA present signal voltage is applied to the igniter 74 to make it on stand-by. The lower air bag 322 will deploy with a less strength when an accident occurs. In response to the second passenger's seat being occupied by an infant or a small child, or being unoccupied, no signal voltage is applied to the igniters 71 and 74. The air bags 321, 322 will not deploy when an accident occurs.

Although two kinds of air bag adjusting systems including an air bag with two independent igniters in an inflator (the first passenger's seat) and two independent air bags (the second passenger's seat), are described as above, it should be unstood that either one or both of them are alternative to be installed to a vehicle.

Figure 3A:
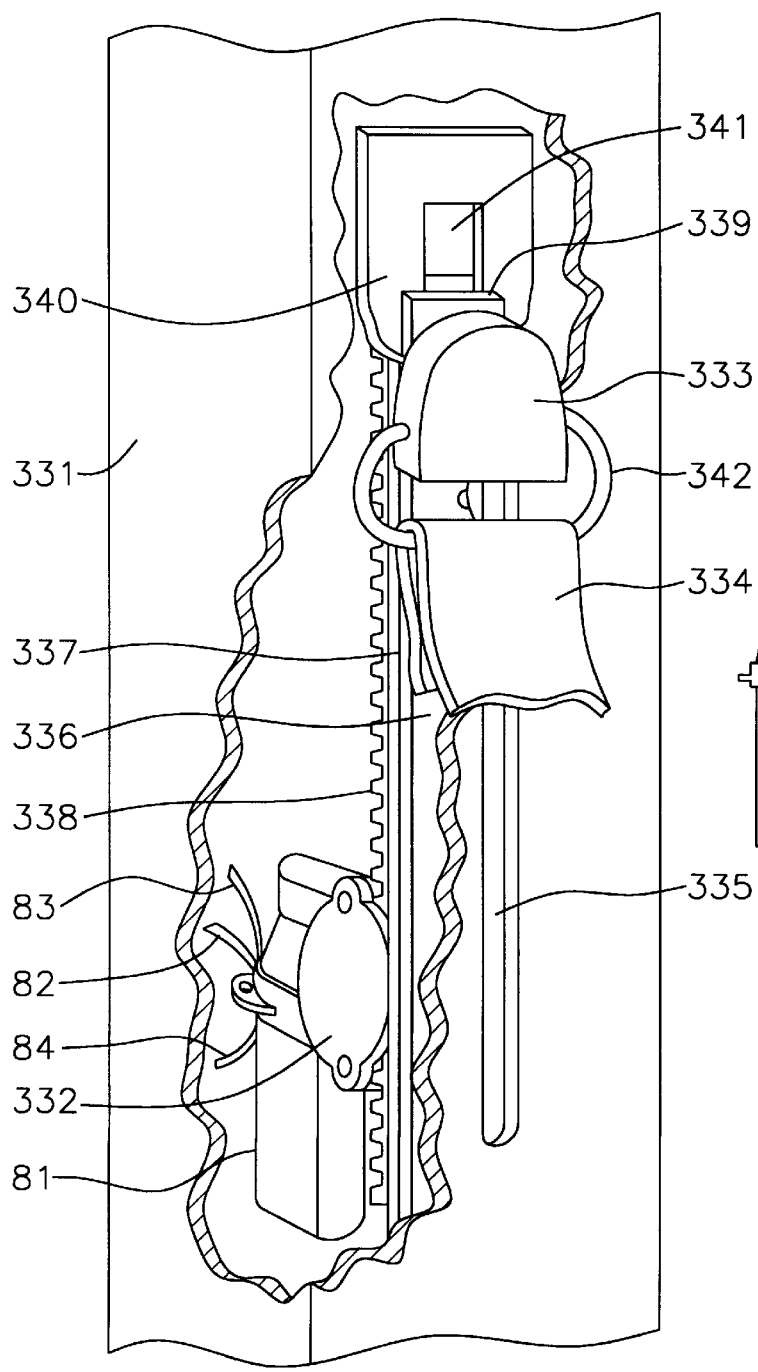
FIG. 3a is a perspective view, with parts broken away, of an electrically operated shoulder belt height adjusting device that is included in the embodiment of FIG. 1.
Figure 3B:
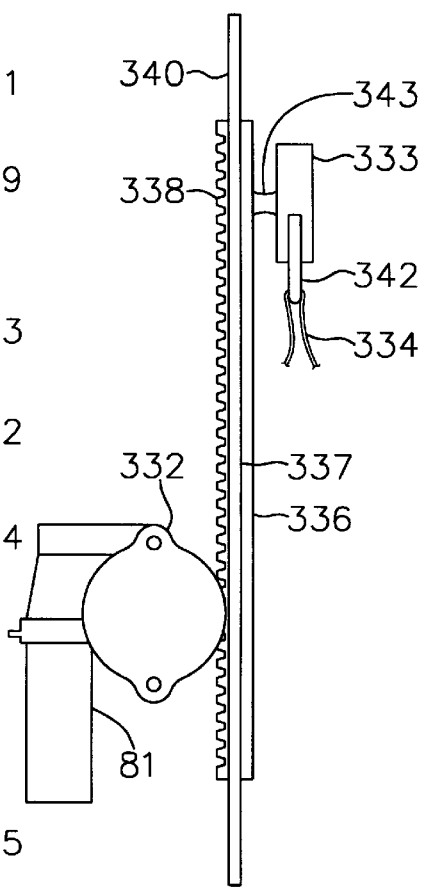

As shown in FIG. 1 in connection with FIGS. 3a and 3b, an electrically operated shoulder belt height adjusting device of the first passenger's seat, has a shoulder belt anchor 333 to hang a "D" ring 342. Shoulder belt 334 is crossed the "D" ring 342. The anchor 333 is fastened to a movable gear rack 336 through a connector 343. The connector 343 scarfs into a guide channel 335 that is on a pillar 331 of the vehicle. Thus the anchor 333 outside of the pillar 331 and the gear rack 336 inside of the pillar 331 are both moved up and down. A plate 340 with a guide rail 341 scarfs into two guide ditches 337, 339 which locate respectively on two side surfaces of the gear rack 336. The gear rack 336 with the gear teeth 338 is coupled to a motor 81 (M2) through a worm wheel assembly 332. The gear rack 336 is in meshing engagement with the wheel of the assembly 332, the worm of which is coupled to the rotary shaft of the motor 81. The motor 81, the worm wheel assembly 332 and the plate 340 are fastened into the pillar 331 respectively. The motor 81 has two leading-in electric wires 83, 82 and an outgoing electric wire 84 to rotate the motor 81 in different directions when electric current flows from different leading-in wires. The wire 83 is connected to the contact 13 through a diode 86. The wire 82 is connected to the contact 14 through a diode 85. The wire 84 is connected to ground.

In response to the first passenger's seat being occupied by an adult, an adult present signal voltage is applied to the motor 81 via diode 86. The motor 81 rotates in the farward direction, such rotation is transmitted through the assembly 332 to move the gear rack 336 up. Thus the shoulder belt anchor 333 is moved to a higher position. In response to the first passenger's seat being occupied by a child or a small adult, a CSA present signal voltage is applied to the motor 81 via diode 85. The motor 81 rotates in the reverse direction to cause the gear rack 336 moving down. Thus the shoulder belt anchor 333 is moved to a lower position. In response to the first passenger's seat being unoccupied, or being occupied by an infant or a small child, no signal voltage is applied to the motor 81, the motor 81 does not rotate to move the shoulder belt anchor 333.

Similar to the first passenger's seat, an electrically operated shoulder belt height adjusting device is installed to a second passenger's seat. A motor 91 (M3) of the second passenger adjusting device has two leading-in electric wires 93, 92 and an outgoing electric wire 94 to rotate the motor 91 in different directions when electric current flows from different leading-in wires. The wire 93 is connected to the contact 23 through a diode 96. The wire 92 is connected to the contact 24 through a diode 95. The wire 94 is connected to ground.

In response to the second passenger's seat being occupied by an adult, an adult present signal voltage is applied to the motor 91 via diode 96, to move the second passenger shoulder belt anchor to a higher position. In response to the second passenger's seat being occupied by a child or a small adult, a CSA present signal voltage is applied to the motor 91 via diode 95, to move the anchor to a lower position. In response to the second passenger's seat be unoccupied, or being occupied by an infant or a small child, no signal voltage is applied to the motor 91, the anchor is not moved.

Similar to the first passenger's seat, an electrically operated shoulder belt height adjusting device is also installed to a driver's seat (not shown in FIG. 1).

As shown in FIG. 1, a child safeguard function is installed to a first passenger's seat. A switch 115 of a first passenger's side window has an up contact 102 and a down contact 103 that are respectively connected to an up signal line 106 and a down signal line 107 of an electrically operated window 108 (W1). Electrically operated windows are well known to those skilled in the art. A pole 101 is connected to a switch arm 105. A first passenger may move the arm 105 from a center-off contact 104 of the switch 115 to either the contact 102 or the contact 103 to cause the window 108 being closed or opened respectively. The contact 102 is connected to the contact 15 through a diode 118. The pole 101 is connected to a single pole single throw latching switch 109. A pole 110 of the switch 109 is connected to Vcc. The switch 109 is operated by two coils 111, 112. The two ends of the coil 111 are connected respectively to the contact 15 and to ground. The two ends of the coil 112 are connected respectively to ground, and to both the contacts 13, 14 separately through diodes 116, 117. Diodes 113, 114 are respectively connected across the coils 111, 112 to suppress the voltage transient.

In response to the first passenger's seat being occupied by either an adult or, a child or a small adult, an adult present signal voltage or a CSA present signal voltage is applied to the coil 112 via either diode 116 or diode 117 to cause the switch 109 being closed. Thus the voltage, Vcc, is applied to the pole 101 via switch 109 to cause the window 108 being operated by the passenger. In response to the first passenger's seat being occupied by an infant or a small child, an ISC present signal voltage is applied respectively to the contact 102 via diode 118 and to the coil 111, to cause the window 108 being closed and to cause the switch 109 being opened. Thus the voltage, Vcc, is not applied to the pole 101 to cause the window 108 being locked.

A switch 155 of the lock of a first passenger's side door has a lock contact 142 and an unlock contact 143 that are respectively connected to a lock signal line 146 and an unlock signal line 147 of an electric door lock 148 (D1). Electric door locks are well known to those skilled in the art. A pole 141 is connected to a switch arm 145. A first passenger may move the arm 145 from a center-off contact 144 of the switch 155 to either the contact 142 or the contact 143 to cause the door lock 148 being locked or unlocked respectively. The contact 142 is connected to the contact 15 through a diode 156. The pole 141 is connected to a single pole single throw latching switch 149. A pole 150 of the switch 149 is connected to Vcc. The switch 149 is operated by two coils 151, 152. The two ends of the coil 151 are respectively connected to the contact 15 and to ground. The two ends of the coil 152 are respectively connected to ground, and to both the contacts 13, 14 separately through the diodes 116, 117. Diodes 153, 154 are respectively connected across the coils 151, 152 to suppress the voltage transient.

In response to the first passenger's seat being occupied by either an adult or, a child or a small adult, an adult present signal voltage or a CSA present signal voltage is applied to the coil 152 via either diode 116 or diode 117 to cause the switch 149 being closed. Thus the voltage, Vcc, is applied to the pole 141 via switch 149 to cause the door lock 148 being operated by the passenger. In response to the first passenger's seat being occupied by an infant or a small child, an ISC present signal voltage is applied respectively to the contact 142 via diode 156 and to the coil 151, to cause the door lock 148 being locked and to cause the switch 149 being opened. Thus the voltage, Vcc, is not applied to the pole 141 to cause the door lock 148 which can not be unlocked by the passenger.

Similar to the first passenger's seat, a child safeguard function is installed to a second passenger's seat. A switch 135 includes a pole 121, a switch arm 125, a center-off contact 124, an up contact 122 and a down contact 123. The contacts 122, 123 are connected to an electrically operated window 128 (W2) respectively with an up signal line 126 and a down signal line 127. The contacts 122, 121 are respectively connected to the contact 25 through diode 138, and to Vcc through a single pole single throw latching switch 129 that is operated by two coils 131, 132. The two ends of the coil 131 are respectively connected to the contact 25 and to ground. The two ends of the coil 132 are respectively connected to ground, and to both the contacts 23, 24 separately through diodes 136, 137. Diodes 133, 134 are respectively connected across the coils 131, 132 to suppress the voltage transient.

A switch 175 includes a pole 161, a switch arm 165, a center-off contact 164, a lock contact 162 and an unlock contact 163. The contacts 162, 163 are connected to an electric door lock 168 (D2) respectively with a lock signal line 166 and an unlock signal line 167. The contacts 162, 161 are respectively connected to the contact 25 through diode 176, and to Vcc through a single pole single throw latching switch 169 that is operated by two coils 171, 172. The two ends of the coil 171 are respectively connected to the contact 25 and to ground. The two ends of the coil 172 are respectively connected to ground and to both the contacts 23, 24 separately through diodes 136, 137. Diodes 173, 174 are respectively connected across the coils 171, 172 to suppress the voltage transient.

In response to the second passenger's seat being occupied by either an adult or, a child or a small adult, an adult present signal voltage or a CSA present signal voltage is applied via either diode 136 or diode 137 respectively to the coils 132, 172, to cause the switches 129, 169 being closed. Thus the voltage, Vcc, is applied respectively to the poles 121, 161 to cause the window 128 and the door lock 168 being operated by the passenger. In response to the second passenger's seat being occupied by an infant or a small child, an ISC present signal voltage is applied respectively to the contacts 122, 162 and the coils 131, 171, to cause the window 128 being closed, the door lock 168 being locked and both the switch 129, 169 being opened. Thus the voltage, Vcc, is not applied to either the pole 121 or the pole 161, to cause the window 128 and the door lock 168 being not operated by the passenger.

As shown in FIG. 1 in connection with FIG. 4, an electrically operated parking brake system includes a normal hand brake system which is simplified with two rear brake drums 357, a fork parking brake cable 358 & 359 and a hand brake lever 360. A cable 356 is additionally fastened to the cable 358 & 359. The other end of the cable 356 is fastened to a lift arm 355 which is connected to a sector gear 353. The sector gear 353 is coupled to a motor 181 (M4) through a worm wheel assembly 351. The sector gear 353 is in meshing engagement with the wheel of the assembly 351, the worm of which is coupled to the rotary shaft of the motor 181. The motor 181, the worm wheel assembly 351 and the sector gear shaft 354 of the sector gear 353 are fastened to the vehicle respectively. The motor 181 has two leading-in electric wires 182, 183 and an outgoing electric wire 184 to rotate the motor 181 in different directions when electric current flows from different leading-in wires. The wire 182 is connected to the contact 33 through a diode 185, a contact 191, an igniting switch arm 187 and a contact 189. The wire 183 is connected to the contact 39 through a diode 186, a contact 192, an igniting switch arm 188 and a contact 190.

The wire 184 is connected to ground. The switch arms 187, 188, the contacts 189, 191, 190, 192 and other two contacts form a double pole double throw latching igniting switch. When a driver starts the engine of the vehicle, the switch arm 187 connects the contacts 189, 191 and the switch arm 188 does not connect the contacts 190, 192. When the driver turns off the engine, the switch arm 187 does not connect the contacts 189, 191 and the switch arm 188 connects the contacts 190, 192.

In response to all the driver's seat and the passenger's seats being unoccupied and the igniting switch arm 187 being opened, the igniting switch arm 188 being closed (the driver turns off the engine), a vehicle empty security signal voltage is applied to the motor 181 via diode 186. The motor 181 rotates in the forward direction to cause the sector gear 353 to be rotated to pull the cable 356, thus the parking brake is set automatically. In response to the driver's seat being occupied and the igniting switch arm 187 being closed, the igniting switch arm 188 being opened (the driver starts the engine), a driver present signal voltage is applied to the motor 181 via diode 185. The motor 181 rotates in the reverse direction, such rotation is transmitted through the assembly 351 to rotate the sector gear 353 to release the parking brake.

It should be understood that the hand brake lever 360 is still controlled by hand to set or to release the parking brake when the driver wants to do it. And, in order to increasing more protection to the passengers, the contact 190 can be changed to connect with the contact 37 (this connection is not shown in FIG. 1). Thus while the driver turns off the engine and only the driver's seat being unoccupied, the parking brake is set automatically.

As shown in FIG. 1, a switch 210 of a sunroof has a close contact 202 and a open contact 203 that are respectively connected to a close line 206 and a open line 207 of an electrically operated sunroof 208 (SR). Electrically operated sunroofs are well known to those skilled in the art. A pole 201 is connected to a switch arm 205 and to Vcc respectively. A driver or a passenger may move the arm 205 from a center-off contact 204 of the switch 210 to either the contact 202 or the contact 203 to cause the sunroof being closed or opened respectively. The contact 202 is connected to the contact 39 through a diode 209.

In response to all the driver's seat and the passenger's seats being unoccupied, a vehicle empty security signal voltage is applied to the contact 202 via diode 209 to cause the sunroof 208 being closed automatically.

As shown in FIG. 1 in connection with FIGS. 5a, 5b, 5c and 5d, an electically operated windshield curtain 371 of a motor vehicle is rolled up to a horizontal axis 372. Each end of the axis 372 has two bars 401 that is respectively pushed into two holes 402 of a rolling wheel 403. An end of a roll of spring 404 is fastened to the wheel 403 with a bolt 405. The other end of the spring 404 is fastened into a round cover 373 that is fixed to upside of the winshield 387. Thus the curtain 371 is hanged horizontally on upside of the windshield with two round covers 373, 374. Two strings 378, 379 that are fastened to each end of the low edge of the curtain 371 are spooled to a single shaft double bobbin device 382 respectively from different directions through pulleys 380, 381. The bobbin device 382 includes two bobbins 383, 384 where the strings 378, 379 separately spool to, a piece of pipe shaped shaft 389 with an enlarged end 391, an axis 388 having a coil 224 with two ends 225, 226. The bobbins 383, 384 are connected together having a general hollowed shaft 396 with an enlarged hollowed end 397, several holes 398 on a side surface 395. The axis 388 with the coil 224 is crossed into the pipe shaped shaft 389. The shaft 389 fastened to the downside of the windshield is crossed into the bobbins 383, 384 where a ring 393 with a screw 394 being fastened. A movable motor 221 (M1) having a piece of plate 385 fastened to a guide rail 386, having a rotary shaft 399 with several bars 400 sticked out of its surface, and having two electric wires 222, 223, is movable follow the guide rail 386. A coil 228 having two end 229, 230 is fastened to the vehicle. The bobbin device 382, the movable motor 221 and the coil 228 are installed in a straight line. The end 229 is connected to the contacts 33, 13, 14, 15, 23, 24 and 25 respectively through the diodes 100, 87, 88, 89, 97, 98 and 99. The end 225 and the wire 222 are connected to the contact 39 respectively. The end 230, 226 and the wire 223 are connected to ground. Diodes 231, 227 are respectively connected cross the coils 228, 224 to suppress the voltage transient. All above devices are installed into a covering shell 375 & 376. The curtain 371 will be spreaded down and rolled up follow a guide ditch 377 on the shell 375 & 376.

In response to all the driver's seat and the passenger's seats being unoccupied, a vehicle empty security signal voltage is applied respectively to the motor 221 and the coil 224. The coil 224 causes the rotary shaft 399 of the motor 221 to connect with the bobbin device 382. The motor rotates the bobbins 383, 384 to pull the curtain 371 spreaded down to cover the windshield 387 fully. In response to either a driver's seat or a passenger's seat being occupied, a driver present signal voltage or a passenger present signal voltage is applied to the coil 228. The coil 228 causes the rotary shaft 339 to disconnect with the bobbin device 382. Thus the springs 404 of the round covers 373, 374 will roll up the curtain 371 automatically.

Figure 5A:
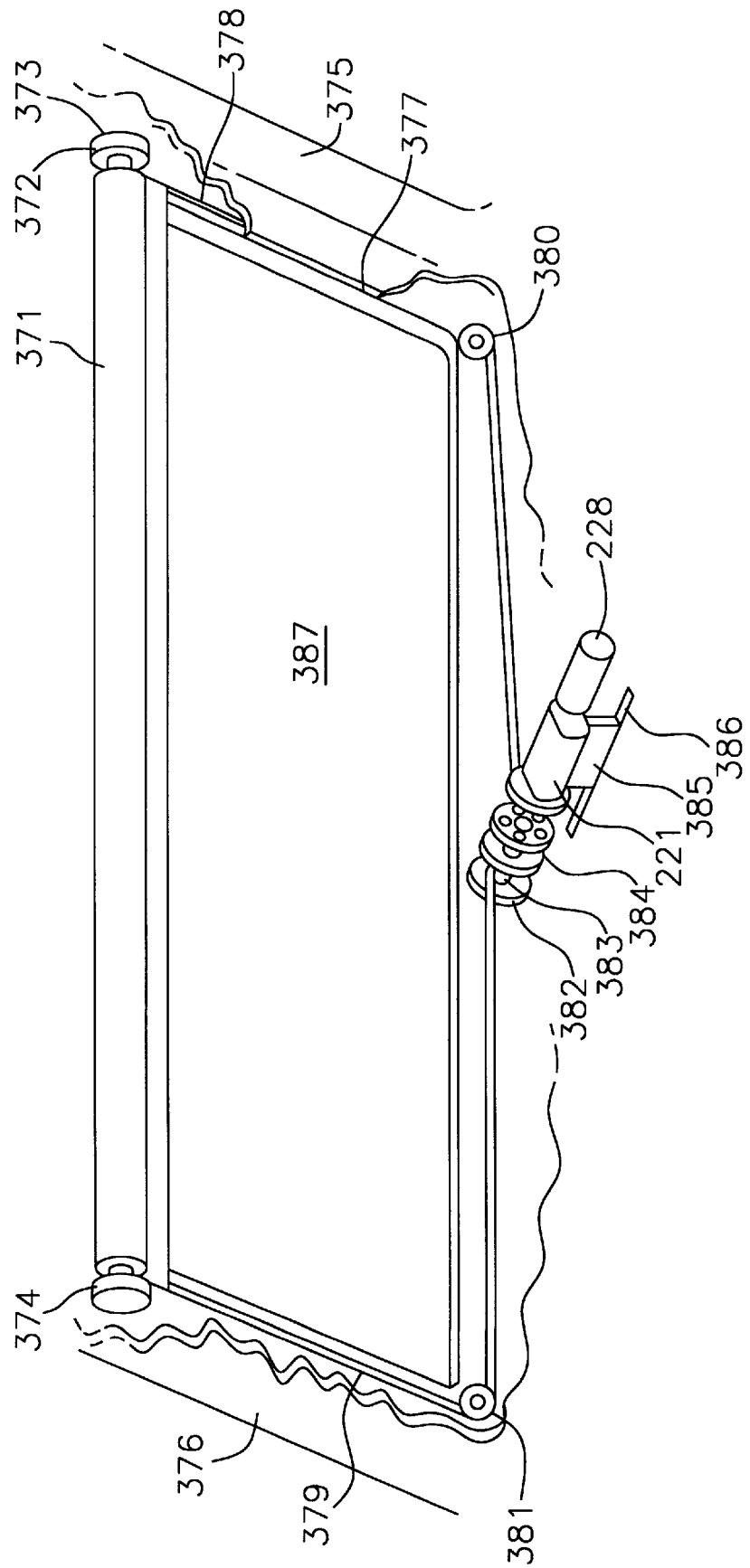
FIG. 5a is a perspective view, with parts broken away, of an electrically operated windshield curtain that is included in the embodiment of FIG. 1.
Figure 5B:
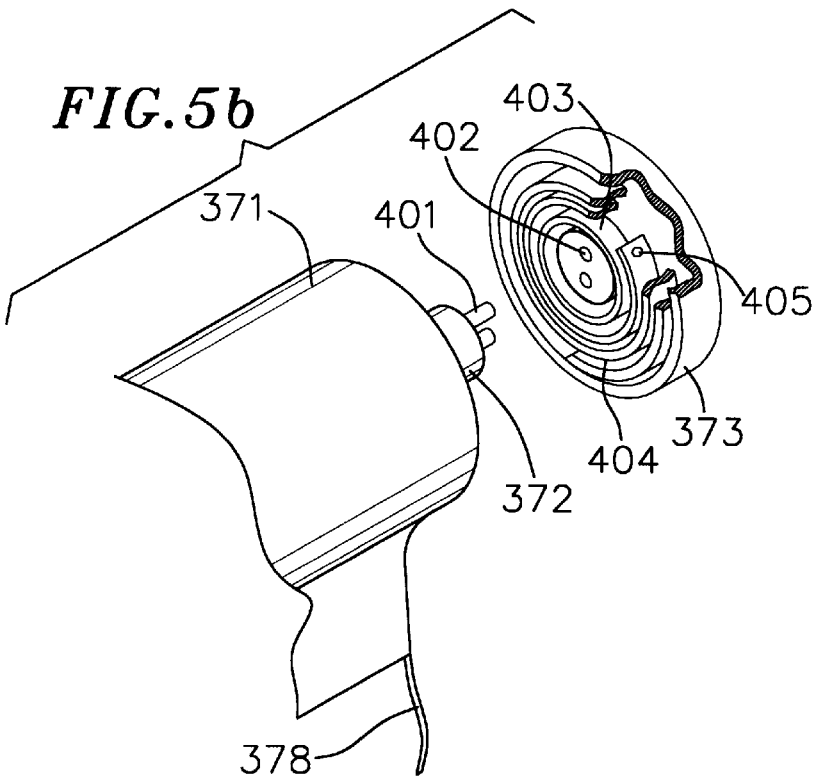
Figure 5C:
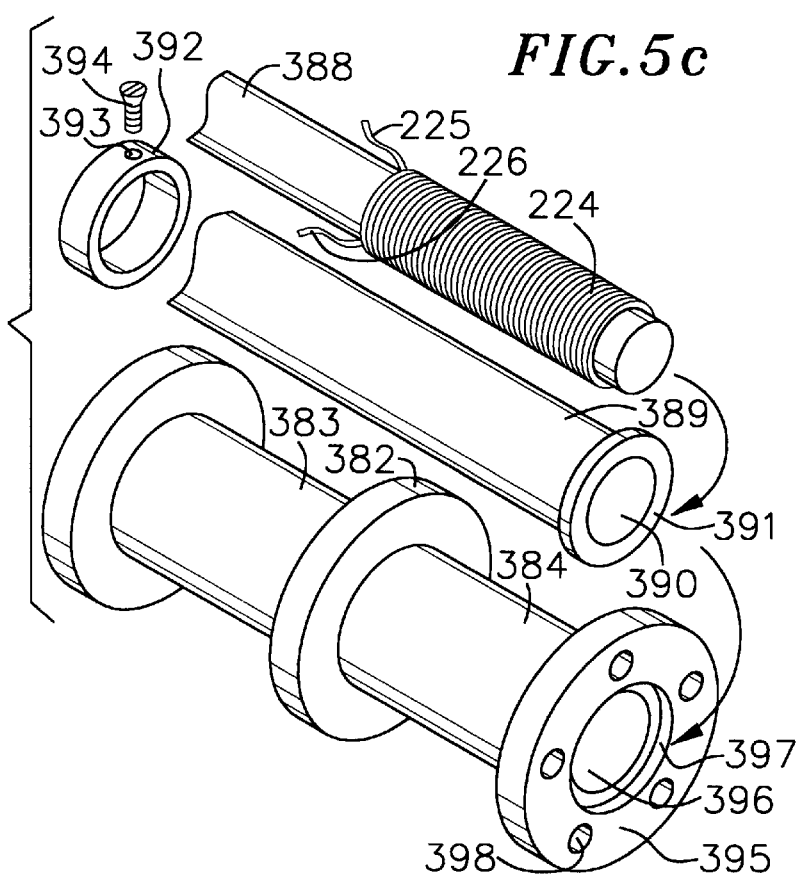
Figure 5D:
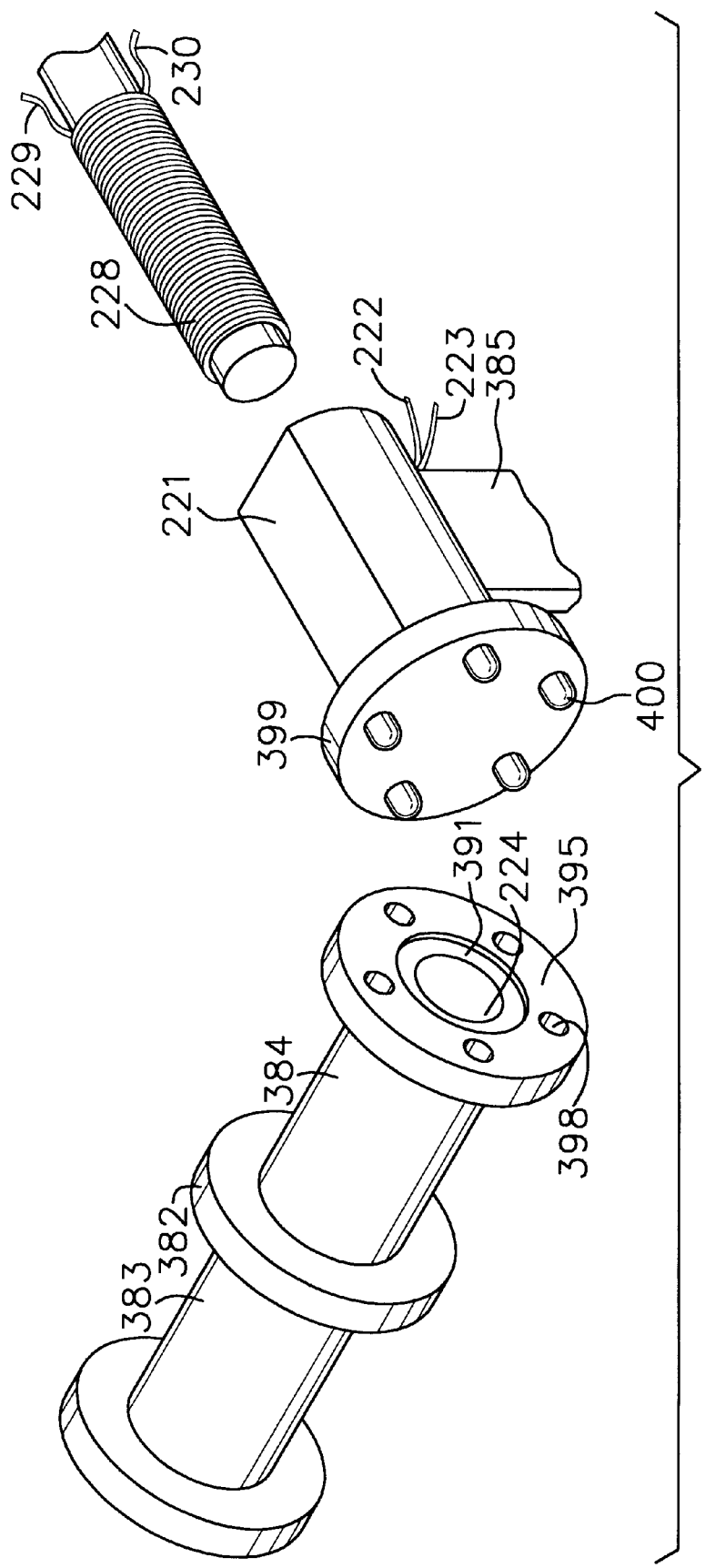
Figure 5E:
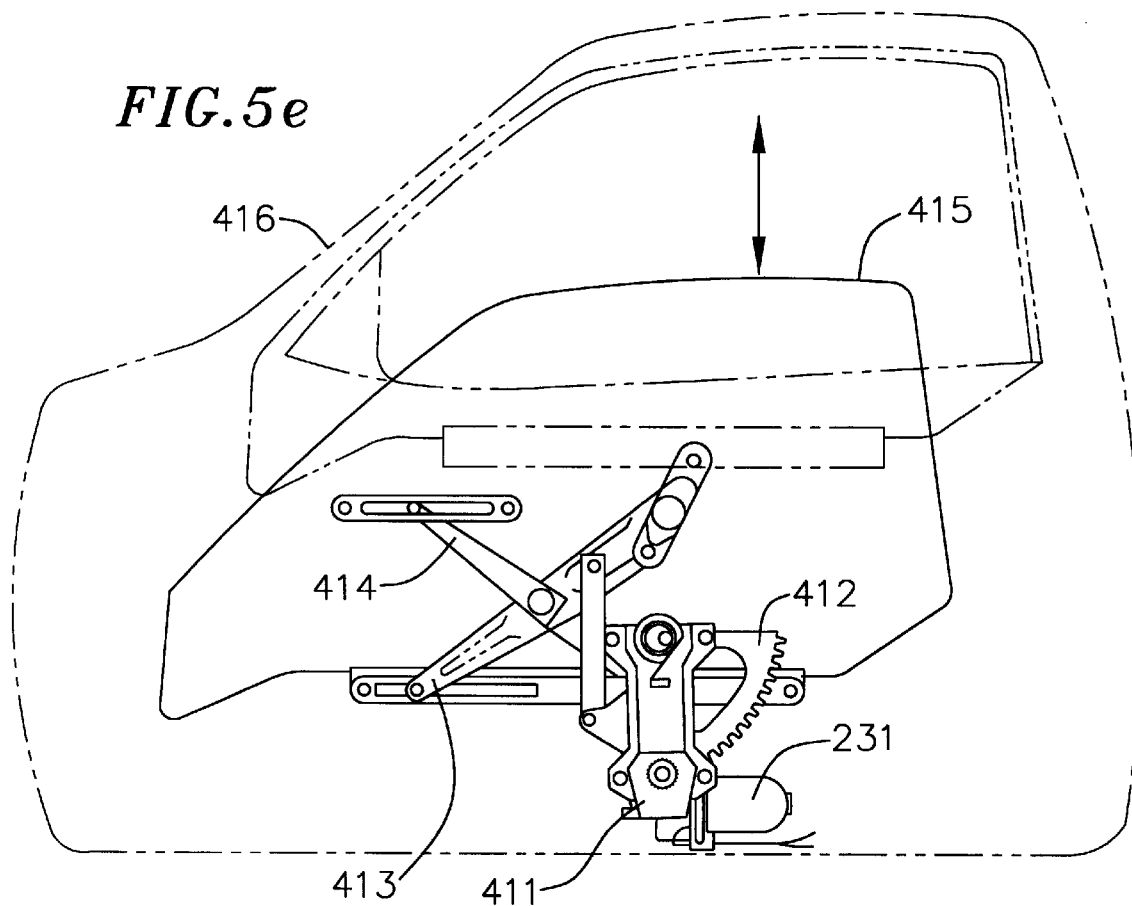
FIG. 5e is side view of an electrically operated window sunshade panel that is included in the embodiment of FIG. 1.
Figure 5F:
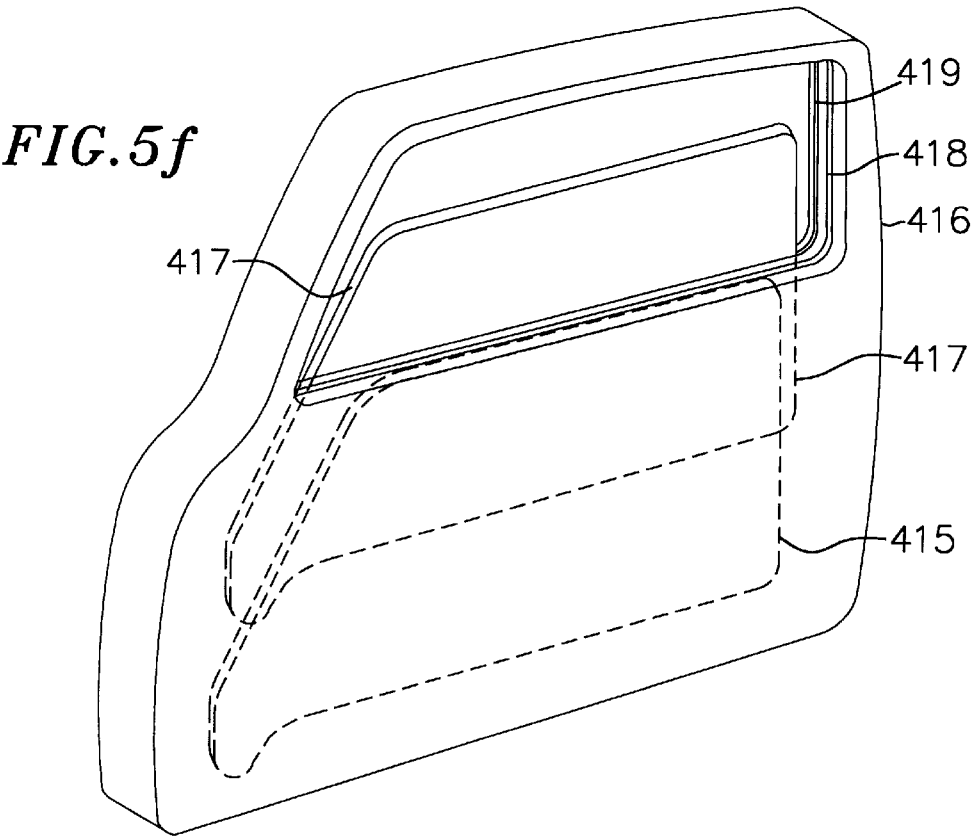
FIG. 5f is a perspective view showing a window glass pane and a sunshade panel of FIG. 5e.

As shown in FIG. 1 in connection with FIGS. 5e and 5f, an electrically operated side window sunshade panel of a motor vehicle includes a window sunshade panel 415 and an elevating mechanism. The sunshade panel 415 is a piece of metal or plastic panel that parallels to a glass pane 417 of the window. The panel 415 and the pane 417 can be moved up or down through two ditches 418 and 419 respectively. The elevating mechanism of the panel 415 is similar as a normal electrically driven window glass pane elevating mechanism of a vehicle which is well known to those skilled in the art. It is of non-parallel type, and essentially comprises a lift arm 413 having a pin located on one end thereof pivotally connected to a stationary portion and another pin which is fastened to a lower guide rail which is secured to the panel 415, an equalizer arm 414 having a pin located at one end which is fastened to an upper guide rail secured to a stationary portion and another pin located on the other end thereof which is fastened to a lower guide rail secured the panel 415, a sector gear 412 coupled to the lift arm 413 through a linkage, a worm wheel assembly 411 and a motor 231 (M6). The sector gear 412 is in meshing engagement with the wheel of the assembly 411, the worm of which is coupled to the rotary shaft of the motor 231. The motor 231 has two leading-in electric wires 232, 233 and an ougoing electric wire 234 to rotate the motor 231 in different direction when electric current flows from different leading-in wires. The wire 233 is connected to the contact 39 through a diode 236. The wire 232, through a diode 235, is connected to the contacts 33, 13, 14, 15, 23, 24 and 25 respectively through the diodes 100, 87, 88, 89, 97, 98 and 99. The wire 234 is connected to ground.

In response to all the driver's seat and the passenger's seats being unoccupied, a vehicle empty security signal voltage is applied to the motor 231 via diode 236. The motor 231 rotates in the forward direction, such rotation is transmitted through the assembly 411 to rotate the sector gear 412 clockwise as viewed in FIG. 5e, thus raising the sunshade panel 415 to cover the window. In response to either a drive's seat or a passenger's seat being occupied, a driver present signal voltage or a passenger present signal voltage is applied to the motor 231 via diode 235. The motor 231 rotates in the reverse direction which causes the sector gear 412 to be rotated counter-clockwise in FIG. 5e, thus lowering the sunshade panel 415 to uncover the window.

As shown in FIG. 1, the relay where the contacts 33, 13, 14, 15, 23, 24 and 25 are connected together through the diodes 100, 87, 88, 89, 97, 98 and 99 respectively to generate a vehicle loaded security signal voltage in response to either a driver's seat or a passenger's seat being occupied. It can also activate some electric devices of a motor vehicle, such as a radio device and an electric cigarette lighter (not shown in FIG. 1).

As shown in FIG. 1, an electric wire of a headlamp 243 (L1) and an electric wire of the other headlamp 244 (L2) are respectively connected to a hand-controlling switch 241 which is turned on or turned off the headlamps 243, 244 by a driver. The other electric wires of the headlamps 243, 244 are connected to ground. The pole contact 242 of the switch 241 is connected to Vcc. The switch 241 is also operated by a coil 245. While electric current flows through the coil 245, the switch arm will move to an open position 247. Two lines of the coil 245 are connected respectively to the contact 39 and to ground. A diode 246 is connected across the coil 245 to suppress the voltage transient.

In response to all the driver's seat and the passenger's seats being unoccupied, a vehicle empty security signal voltage is applied to the coil 245 to cause the switch arm of the switch 241 being moved to the open position 247, neither it being closed nor being opened. Thus the headlamps 243, 244 are automatically turned off when the driver forgets to turn them off.

As shown in FIG. 1, two electric wires of a ceiling light 253 (L3) are respectively connected to ground, and to a hand-controlling switch 251 which is turned on or turned off the ceiling light 253 by either a driver or a passenger. The pole contact 252 of the switch 251 is connected to Vcc. The switch 251 is also operated by a coil 254. While electric current flows through the coil 254, the switch arm will move to an open position 256. Two lines of the coil 254 are connected respectively to the contact 39 and to ground. A diode 255 is connected across the coil 254 to suppress the voltage transient.

In response to all the driver's seat and the passenger's seats being unoccupied, a vehicle empty security signal voltage is applied to the coil 254 to cause the switch arm of the switch 251 being moved to the open position 256, neither it being closed nor being opened. Thus the ceiling light 253 is automatically turned off when someone forgets to turn it off.

Figure 6A:
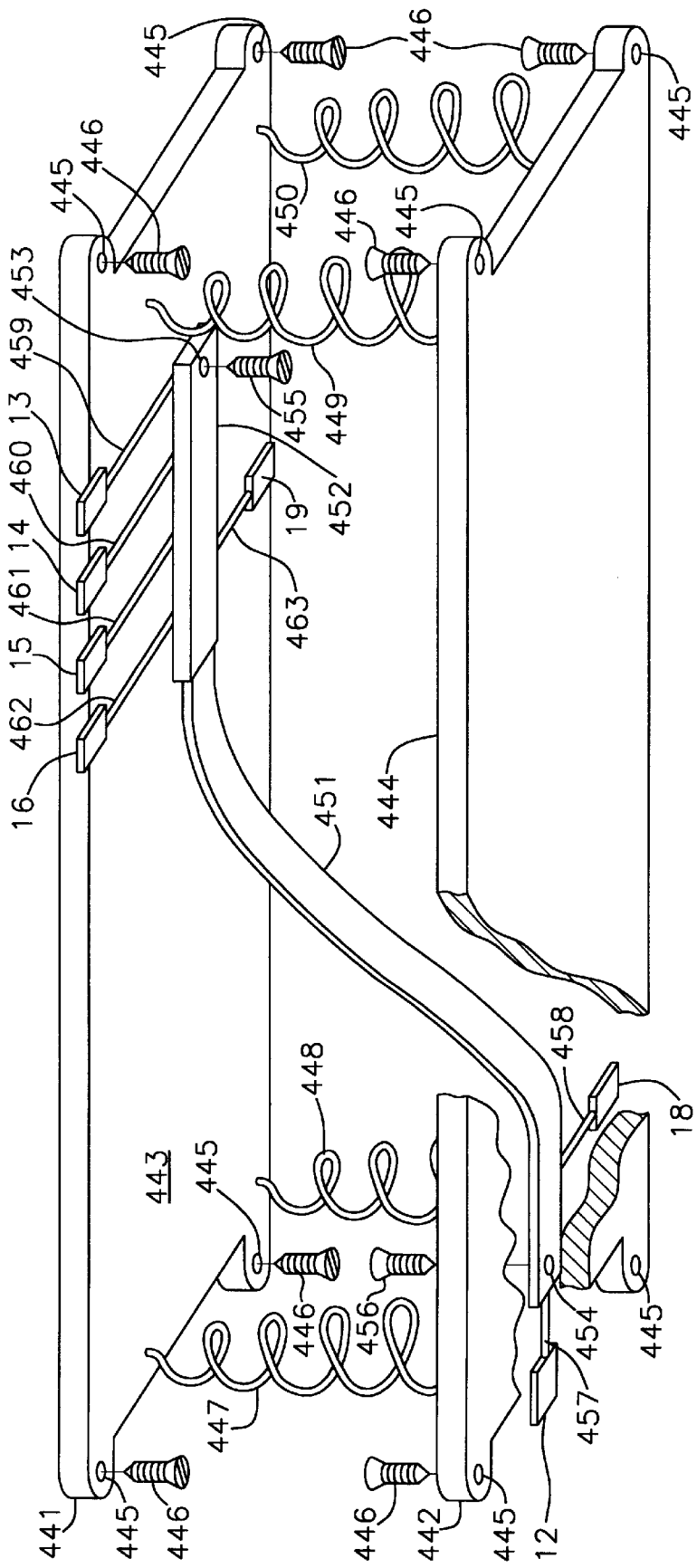
FIG. 6a is a perspective view, with parts broken away, of a seat sensor switch that is included in the embodiment of FIG. 1.
Figure 6B:
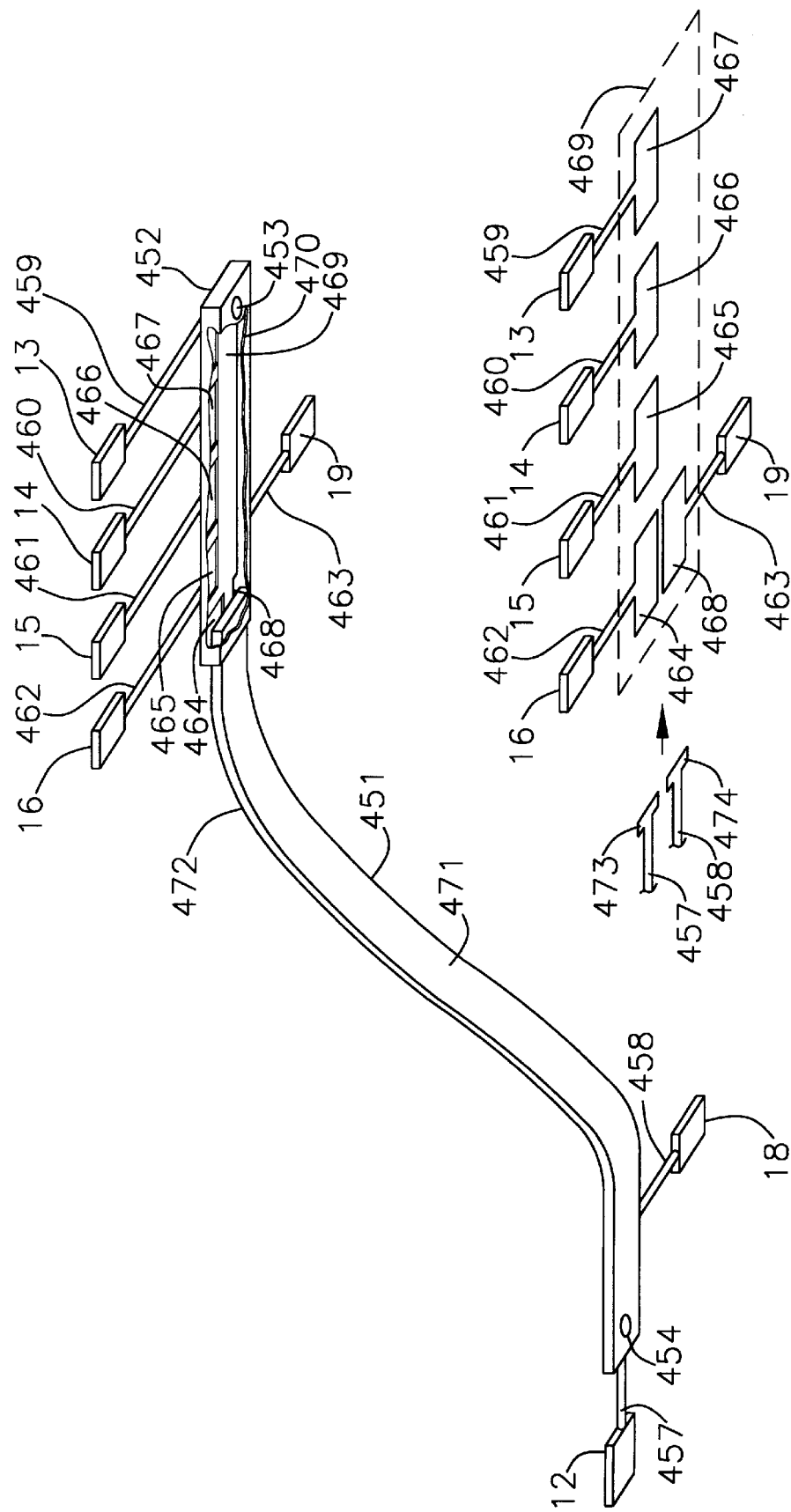
Figure 6C:
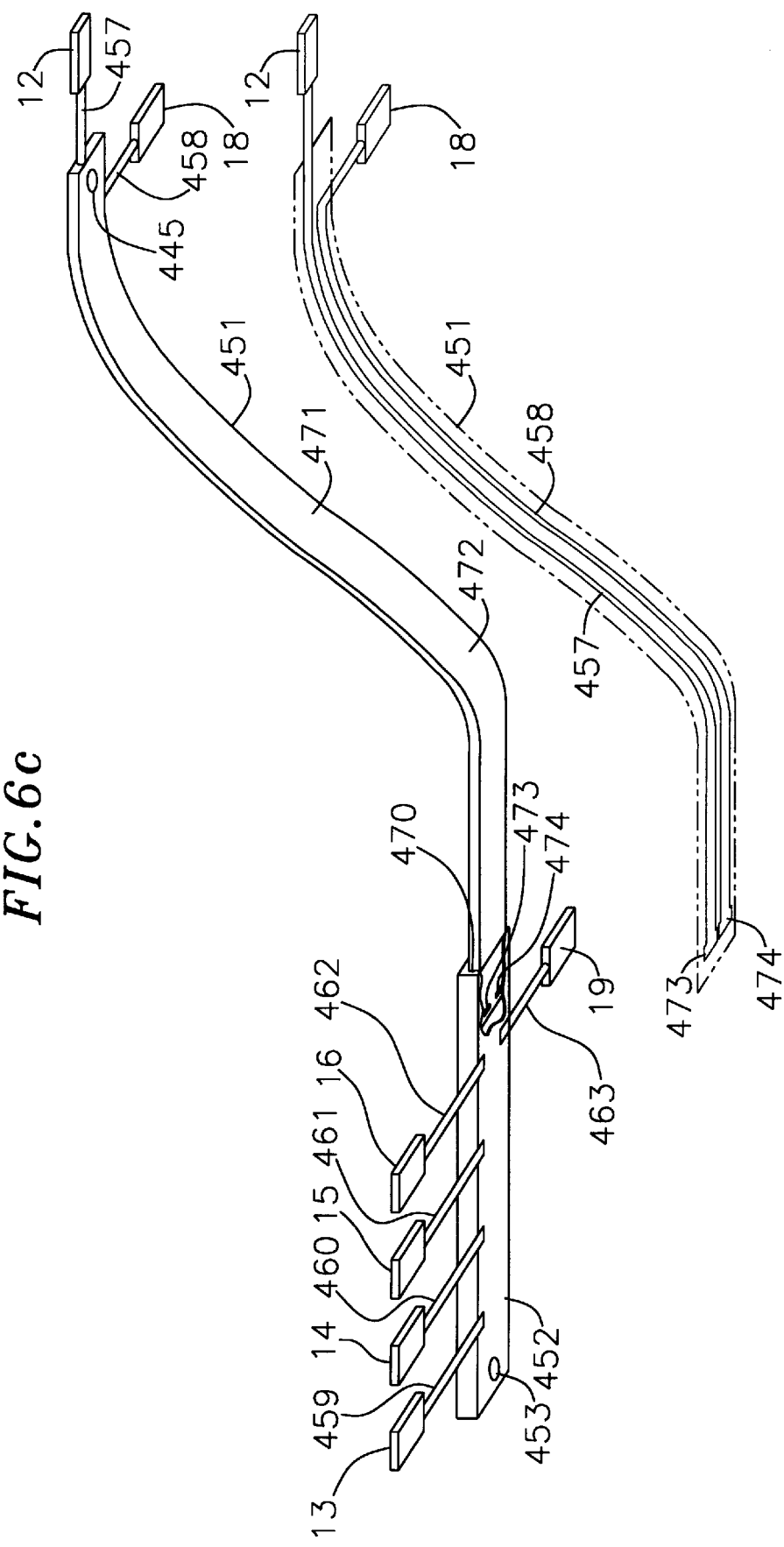

As shown in FIGS. 6a, 6b and 6c, the seat sensor switch 10 has a generally rectangular top panel 441 and a generally rectangular bottom panel 442 at respective opposed surfaces 443, 444 thereof. Four coil springs 447, 448, 449 and 450 separately have two ends that are respectively connected to each corner of the surfaces 443, 444, in the interior of the switch 10. A scabbard-like contact device 452 having generally exterior insulating rectangular surfaces and a hollow side surface, with an interior insulating rectangular top surface 469 and an interior insulating rectangular bottom surface 470, is fixedly connected to the surface 443 of the top panel 441 with a screw 455 through a hole 453. The interior top surface 469 has four metal contact chips 464, 465, 466, 467 fixed in a straight line and a metal contact chip 468 fixed in a parallel line. The metal chips 464, 465, 466, 467 and 468 are insulated to each other. Contacts 16, 15, 14, 13 and 19 being fixed to the panel 441 are connected to the metal chips 464, 465, 466, 467 and 468 respectively through lines 462, 461, 460, 459 and 463. A S shaped spring panel 451 with generally exterior insulating surfaces including a top surface 472 and a bottom surface 471, are fixedly connected to the surface 444 of the bottom panel 442 with a screw 456 through a hole 454. Two contacts 473, 474 on the top surface 472 of a movable end of the spring panel 451 are respectively through lines 457, 458, connected to two contacts 12, 18 which are fixed to the panel 442. The movable end of the spring panel 451 is always sheathed into the contact device 452 between the interior surfaces 469, 470. When the springs 447, 448, 449 and 450 are not compressed, the contacts 473, 474 contact respectively to the metal chips 464, 468. When the springs 447, 448, 449 and 450 are compressed, the positions of the contacts 473, 474 change within the device 452. According to the compressive force being stronger and stronger, the contact 473 will contact the metal chips 465, 466, 467 one after another, the contact 474 will not contact any metal chip. The contacts 12, 18 are connected respectively to the positive terminal of the battery.

Figure 8:
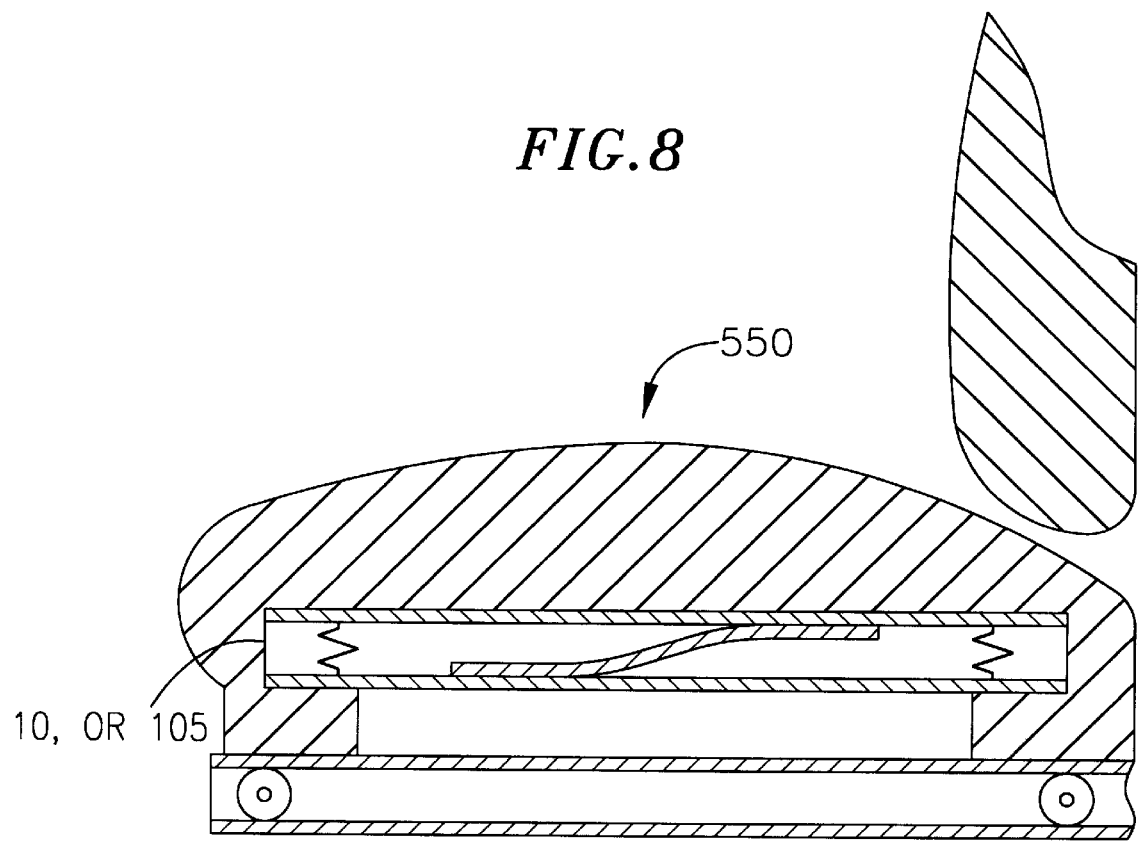
FIG. 8 is a section of a side elevation of a seat where the switch of FIG. 6a or FIG. 7a is installed.

As shown in FIG. 8, screws 446 respectively pass through the holes 445 to fasten the switch 10 into a seat 550 of the vehicle. The switches 20 and 30 are same objects of similar construction.

As shown in FIGS. 6a, 6b, 6c and 8 in connection with FIG. 1, in response to the seat 550 being unoccupied, the voltage, Vcc, is applied to the contact 16 via contact 12, line 457, contact 473, chip 464 and line 462 to cause a person absent signal voltage. The voltage, Vcc, is also applied to the contact 19 via contact 18, line 458, contact 474, chip 468 and line 463 to cause a part of vehicle empty security signal voltage. In response to the seat 550 being occupied by an infant or a small child, the contact 473 moves to contact the chip 465, and the contact 474 moves not to contact any chip. Thus the voltage, Vcc, is applied to the contact 15 via contact 12, line 457, contact 473, chip 465 and line 461 to cause an ISC present signal voltage. In respones to the seat 550 being occupied by a child or a small adult, the contact 473 moves to contact the chip 466, and the contact 474 still does not contact any chip. Thus the voltage, Vcc, is applied to the contact 14 via contact 12, line 457, contact 473, chip 466 and line 460 to cause a CSA present signal voltage. In response to the seat 550 being occupied by an adult, the contact 473 moves to contact the chip 467, and the contact 474 still does not contact any chip. Thus the voltage, Vcc, is applied to the contact 13 via contact 12, line 457, contact 473, chip 467 and line 459 to cause an adult present signal voltage.

Figure 7A:
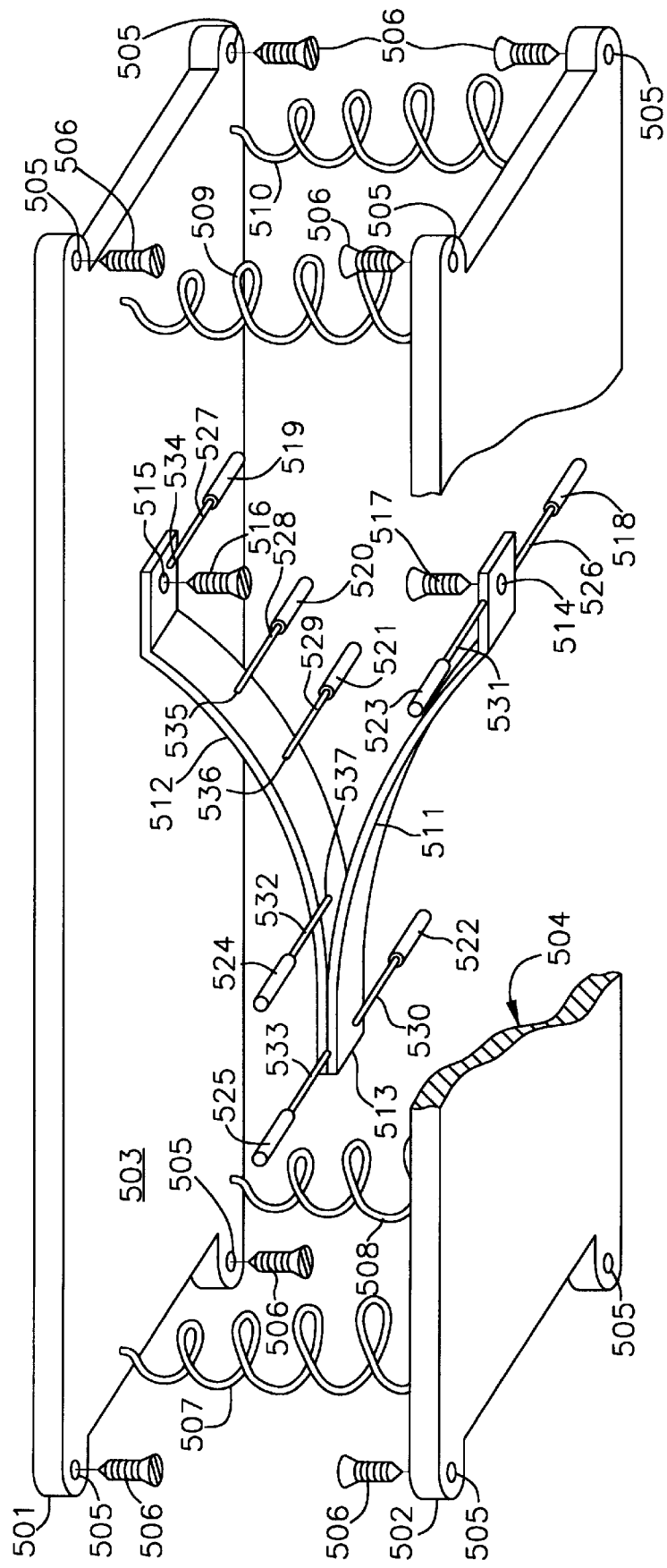
FIG. 7a is a perspective view, with parts broken away, of a seat sensor switch that may be alternatively included in the embodiment of FIG. 1.
Figure 7B:
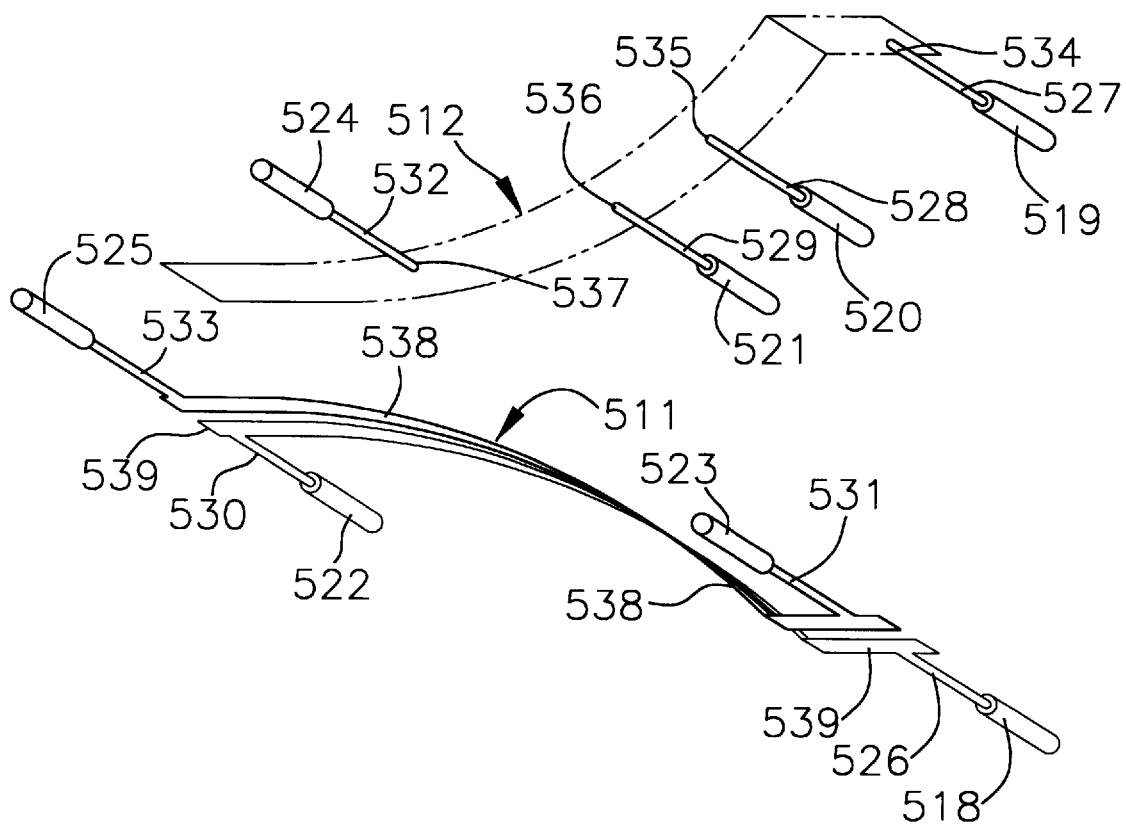
Figure 7C:
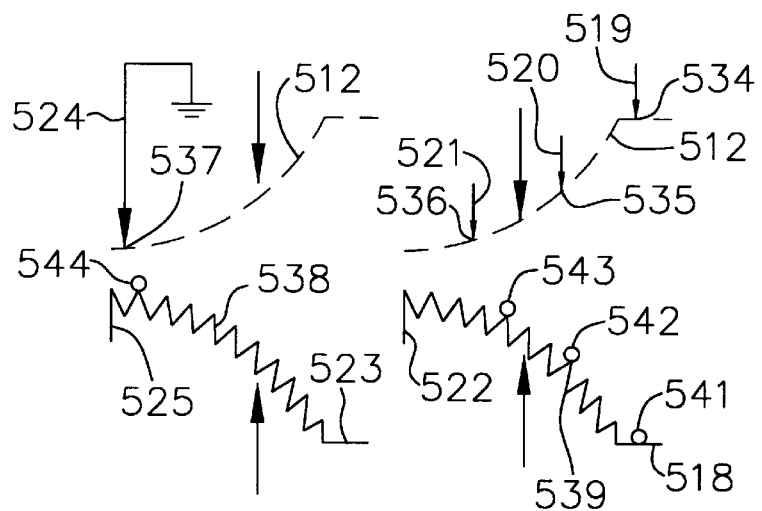
FIG. 7c is a simple diagram to split the main structure of the switch of FIG. 7b in two sections.

As shown in FIGS. 7a, 7b and 7c, an alternative embodiment of the present invention includes a switch 10S comprised a generally rectangular top panel 501 and a generally rectangular bottom panel 502 at respective opposed surfaces 503, 504 thereof. Four coil springs 507, 508, 509 and 510 separately have two ends that are connected respectively to each corner of the surfaces 503, 504, in the interior of the switch 10S. A clamp-like contact device 513 has an upper arcuate shaped leaf spring 512 and a lower arcuate shaped leaf spring 511 that they are similar to each other. The springs 512, 511 have generally exterior insulating surfaces.

An end of the spring 512 is fixedly connected to the surface 503 with a screw 516 through a hole 515. An end of the spring 511 is fixedly connected to the surface 504 with a screw 517 through a hole 514. The other ends of the springs 512, 511 are connected together. Two pieces of parallelled resistors 539, 538 with separated outgoing lines 526, 530 and 531, 533 on their each end, are installed on the top surface of the spring 511. The lines 526, 530, 531 and 533 are respectively connected to contacts 518, 522, 523 and 525. Four contacts 536, 535, 534, 537 separately being connected to contacts 521, 520, 519, 524 through lines 529, 528, 527, 532, locate on the bottom surface of the spring 512. When the springs 507, 508, 509 and 510 are compressed, a contact 544 (not shown in FIG. 7b) of the resistor 538 and three contacts 543, 542, 541 (not shown in FIG. 7b) of the resistor 539 contact respectively to the contacts 537, 536, 535, 534 one after another in accordance with the compressive force being stronger and stronger. When the springs 507, 508, 509 and 510 are not compressed, the contacts 537, 536, 535, 534 do not contact the contacts 544, 543, 542, 541. The contacts 518, 523 are connected respectively to the positive terminal of the battery. The contact 524 is connected to ground.

As shown in FIG. 8, screws 506 respectively pass through the holes 505 to fasten the switch 10S into a seat 550 of the vehicle. The switch 10S can be splited to two indepedent changeable resistors 538, 539 (FIG. 7c) actually. The resistor 538 will cause a part of vehicle empty security signal voltage. The resistor 539 will cause an adult present signal voltage, or a CSA present signal voltage, or an ISC present signal voltage, or person absent signal voltage. In response to the seat 550 being unoccupied, all the contacts 537, 536, 535 and 534 do not contact either resistor 538 or resistor 539. Thus the voltage, Vcc, is applied to the contact 525 via contact 523, line 531, resistor 538 and line 533 to cause a part of vehicle empty security signal voltage. The voltage, Vcc, is also applied to the contact 522 via contact 518, line 526, resistor 539 and line 530 to cause a person absent signal voltage. In response to the seat 550 being occupied by an infant or a small child, the contact 537 contacts the contact 544 of the resistor 538, and the contact 536 contacts the contact 543 of the resistor 539. Thus the voltage, Vcc, is not applied to the contact 525, and it is applied to ground via contact 523, line 531, resistor 538, contacts 544, 537, line 532 and contact 524. An ISC present signal voltage is applied to the contact 521 via contact 518, line 526, resistor 539, contacts 543, 536 and line 529. In response to the seat 550 being occupied by a child or a small adult, the contact 537 still contacts the contact 544 of the resistor 538, and the contacts 535, 536 respectively contact the contacts 542, 543 of the resistor 539. Thus a CSA present signal voltage is applied to the contact 520 via contact 518, line 526, resistor 539, contacts 542, 535 and line 528. No voltage is still applied to the contact 525. In response to the seat 550 being occupied by an adult, the contact 537 still contacts the contact 544 of the resistor 538, and the contacts 534, 535, 536 respectively contact the contacts 541, 542, 543 of the resistor 539. Thus an adult present signal voltage is applied to the contact 519 via contact 518, line 526, resistor 539, contacts 541, 534 and line 527. No voltage is still applied to the contact 525.

The switch 10 shown in FIG. 6a is different as the switch 10S shown in FIG. 7a although they are all compressive style sensor switches. It should be understood that the switch 10 is not a continuous switch. Theoretically, some compressive forces can not cause a present signal voltage when the contact 464 contacts the insulating spots between two metal chips. The switch 10S is a continuous changeable resistor that every compressive force can cause a digital present signal voltage. So the switch 10S is more reliable.

While the invention has been particularly shown and described with reference to a preferred embodiment thereof, it should be understood by those skilled in the art that changes in form and detail may be made therein without departing from the spirit and scope of the invention.

I claim:

1. A safety system for a motor vehicle with an electrically operated sunroof, an electrically operated parking brake, an electrically operated windshield curtain, an electrically operated side window sunshade panel, two headlamps and a ceiling light, comprising:

security means for generating a vehicle empty security signal in response to seats of said vehicle being unoccupied;

means for causing said sunroof to close in response to said vehicle empty security signal;

means for setting said parking brake in response to said vehicle empty security signal;

means for spreading said windshield curtain to cover a windshield in response to said vehicle empty security signal;

means for causing said sunshade panel to cover a side window in response to said vehicle empty security signal;

means for turning off said headlamps in response to said vehicle empty security signal;

means for turning off said ceiling light in response to said vehicle empty security signal;

security means for generating a vehicle loaded security signal in response to either a driver's seat or a passenger's seat of said vehicle being occupied;

means for rolling said windshield curtain up to uncover a windshield in response to said vehicle loaded security signal;

means for causing said sunshade panel to uncover a side window in response to said vehicle loaded security signal;

driver present means for generating a driver present signal in response to a driver's seat of said vehicle being occupied; and a double pole double throw igniting switch latching relay that is connected to said parking brake, said security means and said driver present means, said latching relay being conditioned by said driver present signal to provide a pulse causing said parking brake to release.

2. The system of claim 1 additionally comprises means for generating a driver absent signal in response to a driver's seat of said vehicle being unoccupied, said means for setting said parking brake of said vehicle being in response to said driver absent signal.

3. The system of claim 1 wherein said means for generating said vehicle loaded security signal comprising:

a driver sensor switch installed within a driver's seat including a pair of normally open contacts that close in response to said driver's seat being occupied to generating a driver present signal, a pair of normally closed contacts that open in response to said driver's seat being occupied and close in response to said driver's seat being unoccupied to generating a driver absent signal;

a passenger sensor switch installed within a passenger's seat including a pair of normally open contacts that close in response to said passenger's seat being occupied by an adult to generating an adult present signal, a pair of normally open contacts that close in response to said passenger's seat being occupied by a child or a small adult to generating a child or a small adult present signal, a pair of normally open contacts that close in response to said passenger's seat being occupied by an infant of a small child to generating an infant or a small child signal, a pair of normally closed contacts that open in response to said passenger's seat being occupied and close in response to said passenger's seat being unoccupied to generating a passenger absent signal;

all outgoing contacts of said normally open contacts of said driver and passenger sensor switches are connected together to generating a vehicle loaded security signal.

4. The system of claim 1 wherein said means for generating said vehicle empty security signal includes a driver sensor switch additionally having a pair of normally closed contacts that open in response to said driver's seat being occupied, a passenger sensor switch additionally having a pair of normally closed contacts that open in response to said passenger's seat being occupied, said normally closed contacts of said driver and passenger sensor switches being connected in series.

5. The system of claim 4 wherein said vehicle empty security signal is applied additionally to a device of said vehicle through a switch to activate said device.

6. The system of claim 3 wherein a pair of normally open contacts of said passenger sensor switch that close to generate an adult present signal and a pair of normally open contacts of said passenger sensor switch that close to generate a child or a small adult present signal, apparatus for activating an air bag adjusting device of a passenger air bag of said vehicle comprises:

two independent metal containers with separated doors, separated igniters and different quantities of propellant within an inflator of said air bag, said adult present signal being applied to said igniter of said container with large quantity of propellant, said child or small adult present signal being applied to said igniter of said container with small quantity of propellant; and a motor rotated in two directions with worm wheel assembly being fastened to a gear lack, said gear lack being fastened to said air bag, said adult present signal being applied to said motor to rotate said motor causing said air bag being moved up, said child or small adult present signal being applied to said motor to rotate said motor causing said air bag being moved down.

7. The system of claim 3 wherein a pair of normally open contacts of said passenger sensor switch that close to generate an adult present signal and a pair of normally open contacts of said passenger sensor switch that close to generate a child or small adult present signal, apparatus for alternatively activating an air bag adjusting device of a passenger air bag of said vehicle includes an air bag device at a higher location having a large quantity of propellant within its inflator, an air bag device at a lower location having a small quantity of propellant within its inflator, said adult present signal being applied to an igniter of said inflator with large quantity of propellant, said child or small adult present signal being applied to an igniter of said inflator with small quantity of propellant.

8. The system of claim 3 wherein a pair of normally open contacts of said passenger sensor switch that close to generate an adult present signal and a pair of normally open contacts of said passenger sensor switch that close to generate a child or small adult present signal, apparatus for activating a shoulder belt height adjusting device of a passenger's seat of said vehicle includes a motor rotated in two directions with worm wheel assembly being fastened to a gear rack, said gear rack being fastened to a shoulder belt anchor of said passenger's seat, said adult present signal being applied to said motor to rotate said motor causing said shoulder belt anchor being moved up, said child or small adult present signal being applied to said motor to rotate said motor causing said shoulder belt anchor being moved down.

9. The system of claim 8 wherein said shoulder belt height adjusting device is additionally installed to a driver's seat.

10. The system of claim 3 wherein a pair of normally open contacts of said passenger sensor switch that close to generate an adult present signal, a pair of normally open contacts of said passenger sensor switch that close to generate a child or small adult present signal and a pair of normally open contacts of said passenger sensor switch that close to generate an infant or small child present signal, apparatus for activating a child safeguard function of an electrically operated window comprises:

said infant or small child present signal being applied to said window to close said window;

a single pole single throw switch that opens in response to said infant or small child present signal, and closes in response to said adult present signal or said child or small adult present signal, said switch being connected to a contact of said window to operate electric current flowing from a positive terminal of a battery of said vehicle;

means for alternatively causing said infant or small child present signal to be applied across a coil of said switch, and means for alternatively causing said adult present signal, or said child or small adult present signal to be applied across a coil of said switch.

11. The system of claim 3 wherein a pair of normally open contacts of said passenger sensor switch that close to generate an adult present signal, a pair of normally open contacts of said passenger sensor switch that close to generate a child or small adult present signal and a pair of normally open contacts of said passenger sensor switch that close to generate an infant or small child present signal, apparatus for activating a child safeguard function of an electric door lock comprises:

said infant or small child present signal being applied to said door lock to lock a door;

a single pole single throw switch that opens in response to said infant or small child present signal, and closes in response to said adult present signal or said child or small adult present signal, said switch being connected to said door lock to operate electric current flowing from a positive terminal of a battery of said vehicle;

means for alternatively causing said infant or small child present signal to be applied across a coil of said switch; and means for alternatively causing said adult present signal or said child or small adult present signal to be applied across a coil of said switch.

12. The system of claim 1 wherein said means for setting said parking brake of said vehicle in response to said vehicle empty security signal and said latching relay for releasing said parking brake comprises:

a motor rotated in two directions with a worm wheel assembly being fastened to a sector gear, said sector gear being connected to a lift arm that is fastened to brake drums through a fork parking brake cable;

a double pole double throw igniting switch latch relay having a first switch that closes in response to an igniting switch of said vehicle turning on and opens in response to said igniting switch turning off, a second switch that closes in response to said igniting switch turning off and opens in response to said igniting switch turning on;

said vehicle empty security signal being applied to said motor through said second switch to rotate said motor causing said parking brake being set; and said driver present signal being applied to said motor through said first switch to rotate said motor causing said parking brake being released.

13. The system of claim 1 wherein said means for spreading said windshield curtain of said vehicle in response to said vehicle empty security signal and said means for rolling up said windshield curtain in response to said vehicle loaded security signal comprises:

said windshield curtain being rolled up to a horizontal axis that is fastened horizontally on upside of said windshield with a roll of spring on each end of said axis, two low edge ends of said windshield curtain being fastened to a single shaft double bobbin device through two strings wherein said strings separately spooled to said bobbin device;

a movable motor being fastened to a guide rail having a rotary shaft that can be connected to a rotary shaft of said bobbin devices said vehicle empty security signal being applied to rotate said motor;

said vehicle empty security signal being applied to a first coil to cause said motor connecting with said bobbin device;

said vehicle loaded security signal being applied to a second coil to cause said motor disconnecting with said bobbin device.

14. The system of claim 1 wherein said means for causing said sunshade panel to cover said window in response to said vehicle empty security signal and said means for causing said sunshade panel to uncover said window in response to said vehicle loaded security signal includes a motor rotated in two directions with a worm wheel assembly being fastened to a sector gear, said sector gear being connected to a lift arm that is fastened to said sunshade panel of said window, said vehicle empty security signal being applied to said motor to rotate said motor causing said sunshade panel to cover said window, said vehicle loaded security signal being applied to said motor to rotate said motor causing said sunshade panel to uncover said window.

15. The system of claim 1 wherein said means for turning off said headlamps of said vehicle in response to said vehicle empty security signal includes a single pole single throw switch to turn on and to turn off said headlamps by a driver, said vehicle empty security signal being applied to a coil to cause said switch being turned off.

16. The system of claim 1 wherein said means for turning off said ceiling light of said vehicle in response to said vehicle empty security signal includes a single pole single throw switch to turn on and to turn off said ceiling light by a driver or a passenger, said vehicle empty security signal being applied to a coil to cause said switch being turned off.

17. The system of claim 3 wherein said vehicle loaded security signal is additionally applied to a radio device of said vehicle to cause said radio device being activated.

18. The system of claim 3 wherein said vehicle loaded security signal is additionally applied to an electric cigarette lighter of said vehicle to cause said lighter being activated.

19. The system of claims 3 or 4 wherein said passenger sensor switch comprises:

top and bottom end panels having opposed surfaces where a first pole contact together with a first normally closed outgoing contact and three first normally open outgoing contacts, a second pole contact together with a second normally closed outgoing contact are connected respectively;

a scabbard-like device connected to said top panel having an interior surface, four metal chips in a straight line and a single metal chip in a parallel line being insulated to each other and located on said surface, said three first normally open contacts and said first normally closed contacts being connected to said four chips respectively, said second normally closed contact being connected to said single chips;

a S spring panel connected to said bottom panel having two pole chips that locate on a movable end of said spring panel being sheathed into said scabbard-like device, said pole chips being connected to said first pole contact and said second pole contact respectively;

four coil springs being connected to said panels within said opposed surfaces, one of said four chips that connects to said first normally closed contact and the said single chip that connects to said second normally closed contact being in an abutting relationship with two said pole chips respectively, and three of said four chips that connect to said first normally open contacts being separated with said pole chips when said springs are not compressed, three of said four chips connected to said first normally open contacts being in an abutting relationship one after another with one of said pole chips, and one of said four chips connected to said first normally closed contact and said single chip connected to said second normally closed contact being separated respectively with said pole chips when said springs are compressed by a force being turned from smaller to bigger; and means for making electrical connections to said normally open and closed contacts and said pole contacts on the exterior of said passenger sensor switch.

20. The system of claims 3 or 4 wherein said passenger sensor switch comprises:

top and bottom end panels having opposed surfaces where a clamp-like resistor device is connected respectively;

said resistor device having upper and lower arcuate leaf springs connected with an end connected together, said upper spring having three contacts and a contact that connects to ground, said lower spring having a first resistor with a pole line, an outgoing line and a contact, a second resistor with a pole line, an outgoing line and three contacts;

four coil springs being connected to said panels within said opposed surfaces, said contacts of said upper spring being separated with said contacts of said resistors when said coil springs are not compressed, said contact connected to ground being in an abutting relationship to said contact of said first resistor when said coil springs are compressed, said three contacts of said upper spring being in an abutting relationship to said three contacts of said second resistor one after another when said coil springs are compressed by a force being turned from smaller to bigger; and means for making electrical connections to said contacts, said pole lines and said outgoing lines.

* * * * *